US009189510B2

(12) United States Patent
Song et al.

(10) Patent No.: US 9,189,510 B2
(45) Date of Patent: Nov. 17, 2015

(54) SYSTEM AND METHOD FOR IMPLEMENTING CACHE CONSISTENT REGIONAL CLUSTERS

(71) Applicant: Facebook, Inc., Menlo Park, CA (US)

(72) Inventors: Yee Jiun Song, San Bruno, CA (US); Philippe Ajoux, San Mateo, CA (US); Harry C. Li, Palo Alto, CA (US); Jason Sobel, San Francisco, CA (US); Sanjeev Kumar, San Jose, CA (US); Rajesh Nishtala, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 125 days.

(21) Appl. No.: 13/777,814

(22) Filed: Feb. 26, 2013

(65) Prior Publication Data

US 2014/0244584 A1    Aug. 28, 2014

(51) Int. Cl.
*G06F 17/30*    (2006.01)

(52) U.S. Cl.
CPC ............................... *G06F 17/30345* (2013.01)

(58) Field of Classification Search
CPC ................................................ G06F 17/30345
USPC ........................................................ 707/627
See application file for complete search history.

(56) References Cited

U.S. PATENT DOCUMENTS

| | | | |
|---|---|---|---|
| 6,158,007 A | 12/2000 | Moreh et al. | |
| 6,571,140 B1 | 5/2003 | Wewalaarachchi et al. | |
| 6,877,107 B2 | 4/2005 | Giotta et al. | |
| 6,889,234 B1* | 5/2005 | Li et al. ................................. | 1/1 |
| 6,944,183 B1 | 9/2005 | Iyer et al. | |
| 6,959,329 B2 | 10/2005 | Thakor | |
| 7,009,971 B2 | 3/2006 | Novaes | |
| 7,032,067 B2 | 4/2006 | Massard | |
| 7,089,363 B2 | 8/2006 | Ling et al. | |
| 7,418,475 B2 | 8/2008 | Stewart et al. | |
| 7,502,927 B2 | 3/2009 | Trostle et al. | |
| 7,698,276 B2 | 4/2010 | Seshadri et al. | |
| 7,831,693 B2 | 11/2010 | Lai | |
| 7,856,420 B2 | 12/2010 | Zargham et al. | |

(Continued)

OTHER PUBLICATIONS

Ramesh et al., "Regional Consistency: Programmability and Performance for Non-Cache-Coherent Systems", Jan. 18, 2013, pp. 1-8.*

(Continued)

*Primary Examiner* — Apu Mofiz
*Assistant Examiner* — Jared Bibbee
(74) *Attorney, Agent, or Firm* — Perkins Coie LLP

(57) ABSTRACT

When multiple regional data clusters are used to store data in a system, maintaining cache consistency across different regions is important for providing a desirable user experience. In one embodiment, there is a master data cluster where all data writes are performed, and the writes are replicated to each of the slave data clusters in the other regions. Appended to the replication statements are invalidations for cache values for the keys whose values have been changed in the master data cluster. An apparatus in the master data cluster logs replication statements sent to the slave databases. When a slave database fails, the apparatus extracts the invalidations intended for the failed database and publishes the invalidations to a subscriber in the region of the failed database. The subscriber sends the invalidations to the local caches to cause stale data for those keys to be deleted from the caches.

17 Claims, 22 Drawing Sheets

(56) References Cited

U.S. PATENT DOCUMENTS

| | | | |
|---|---|---|---|
| 7,889,738 B2 | 2/2011 | McAllister et al. | |
| 7,895,158 B2 | 2/2011 | Bosloy et al. | |
| 7,961,667 B2 | 6/2011 | Perzy et al. | |
| 8,126,722 B2 | 2/2012 | Robb et al. | |
| 8,127,035 B1 | 2/2012 | Hood et al. | |
| 8,130,758 B2 | 3/2012 | Cohen | |
| 8,131,832 B1 | 3/2012 | Hood et al. | |
| 8,161,168 B2 | 4/2012 | Lankford et al. | |
| 8,209,285 B2 | 6/2012 | Anand et al. | |
| 8,463,688 B2 | 6/2013 | Ritterman et al. | |
| 8,472,972 B2 | 6/2013 | Nadler et al. | |
| 8,543,534 B2 | 9/2013 | Alves et al. | |
| 8,681,676 B2 | 3/2014 | Budampati et al. | |
| 8,745,185 B1 | 6/2014 | Salo | |
| 8,775,667 B2 | 7/2014 | Reed et al. | |
| 8,787,226 B2 | 7/2014 | Yin et al. | |
| 8,929,391 B2 | 1/2015 | Smith et al. | |
| 8,990,835 B2 | 3/2015 | Labéjof et al. | |
| 2003/0012194 A1 | 1/2003 | Novaes | |
| 2003/0065788 A1 | 4/2003 | Salomaki | |
| 2003/0120502 A1 | 6/2003 | Robb et al. | |
| 2004/0117574 A1* | 6/2004 | Massard | 711/163 |
| 2005/0021836 A1 | 1/2005 | Reed et al. | |
| 2005/0044197 A1 | 2/2005 | Lai | |
| 2005/0055509 A1* | 3/2005 | Ling et al. | 711/133 |
| 2005/0097317 A1 | 5/2005 | Trostle et al. | |
| 2005/0262205 A1 | 11/2005 | Nikolov et al. | |
| 2006/0089131 A1 | 4/2006 | Huang | |
| 2006/0149788 A1 | 7/2006 | Bosloy et al. | |
| 2007/0140250 A1 | 6/2007 | McAllister et al. | |
| 2007/0150480 A1 | 6/2007 | Hwang et al. | |
| 2008/0019300 A1 | 1/2008 | Perzy et al. | |
| 2008/0098446 A1 | 4/2008 | Seckin et al. | |
| 2008/0201451 A1 | 8/2008 | Yu et al. | |
| 2008/0243871 A1 | 10/2008 | Anand et al. | |
| 2009/0131080 A1 | 5/2009 | Nadler et al. | |
| 2009/0172123 A1* | 7/2009 | Ewing | 709/206 |
| 2010/0217837 A1 | 8/2010 | Ansari et al. | |
| 2011/0019672 A1 | 1/2011 | Erramilli et al. | |
| 2011/0231781 A1* | 9/2011 | Betzler et al. | 715/757 |
| 2012/0254063 A1 | 10/2012 | Ritterman et al. | |
| 2013/0018937 A1* | 1/2013 | Kim et al. | 709/202 |
| 2013/0058223 A1* | 3/2013 | Yin et al. | 370/242 |
| 2013/0166729 A1* | 6/2013 | Gole et al. | 709/224 |
| 2014/0101390 A1* | 4/2014 | Sohi et al. | 711/144 |
| 2014/0310293 A1* | 10/2014 | Knoll et al. | 707/756 |

OTHER PUBLICATIONS

Hayashi et al., "Cache Invalidation for Updated Data in Ad Hoc Networks", 2003, pp. 516-535.*

Blaze et al., "Dynamic Hierarchical Caching in Large-Scale Distributed File Systems", Oct. 1991, pp. 1-10.*

Pei Cao et al., "Maintaining Strong Cache Consistency in the World-Wide Web", 2010, pp. 1-17.*

Gladney, "Data Replicas in Distributed Information Services", 1989, ACM, pp. 75-97.*

Yu et al., "A Scalable Web Cache Consistency Architecture", 1999, pp. 1-12.*

Franklin et al., "Transactional Client-Server Cache Consistency: Alternatives and Performance", Sep. 1995, pp. 1-39.*

Co-pending U.S. Appl. No. 13/601,945 by Li, H., et al., filed Aug. 31, 2012.

Non-Final Office Action mailed Jul. 21, 2014, for U.S. Appl. No. 13/601,945 by Li, H., et al., filed Aug. 31, 2012.

Notice of Allowance mailed Jan. 14, 2015, for U.S. Appl. No. 13/601,945 by Li, H., et al., filed Aug. 31, 2012.

Final Office Action Mailed Oct. 14, 2014 in Co-Pending U.S. Appl. No. 13/601,945 of Li, H., et al., filed Aug. 31, 2012.

U.S. Appl. No. 14/620,085 by Li, H., et al., filed Feb. 11, 2015.

Non-Final Office Action mailed Jul. 24, 2015, for U.S. Appl. No. 14/620,085 by Li, H., et al., filed Feb. 11, 2015.

* cited by examiner

SYSTEM AND METHOD FOR IMPLEMENTING CACHE CONSISTENT REGIONAL CLUSTERS

CROSS-REFERENCES TO RELATED APPLICATIONS

This application is related to co-pending U.S. application Ser. No. 13/601,945, entitled, "SUBSCRIPTION GROUPS IN PUBLISH-SUBSCRIBE SYSTEM", filed Aug. 31, 2012 and is incorporated herein in its entirety.

BACKGROUND

Cache memories are used to accelerate access to data on slow storage by managing a subset of the data in smaller, faster, and, typically, more expensive storage. Caches come in many shapes and forms, and can be embodied in hardware, such as central processing unit (CPU) caches, and software, such as Memcached. They can also be layered across several storage layers.

For a large social networking service that uses multiple regional data centers to support requests for data from millions of users, or in one case, billions of users, it is important to maintain cache consistency across data centers. Inconsistent data caching can result in users being served stale data, which results in a non-ideal user experience.

BRIEF DESCRIPTION OF THE DRAWINGS

Examples of techniques for implementing cache consistent regional clusters are illustrated in the figures. One or more embodiments of the present disclosure are illustrated by way of example and not limitation in the figures of the accompanying drawings.

DETAILED DESCRIPTION

When multiple regional data clusters are used to store data in a system, maintaining cache consistency across different regions is important for providing a desirable user experience. In one embodiment, there is a master data cluster where all data writes are performed, and the writes are replicated to each of the slave data clusters in the other regions. Slave data clusters only support read requests. Appended to the replication statements sent from the master data cluster to the slave data clusters are invalidations for cache values for the keys whose values have been changed in the master data cluster. An apparatus in the master data cluster logs replication statements sent to the slave databases. When a slave database fails, the apparatus extracts the invalidations intended for the failed database and publishes the invalidations to a subscriber in the region of the failed database. The subscriber then sends the invalidations to the local caches to cause stale data for those keys to be deleted from the caches.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

General Description

Figure 1:
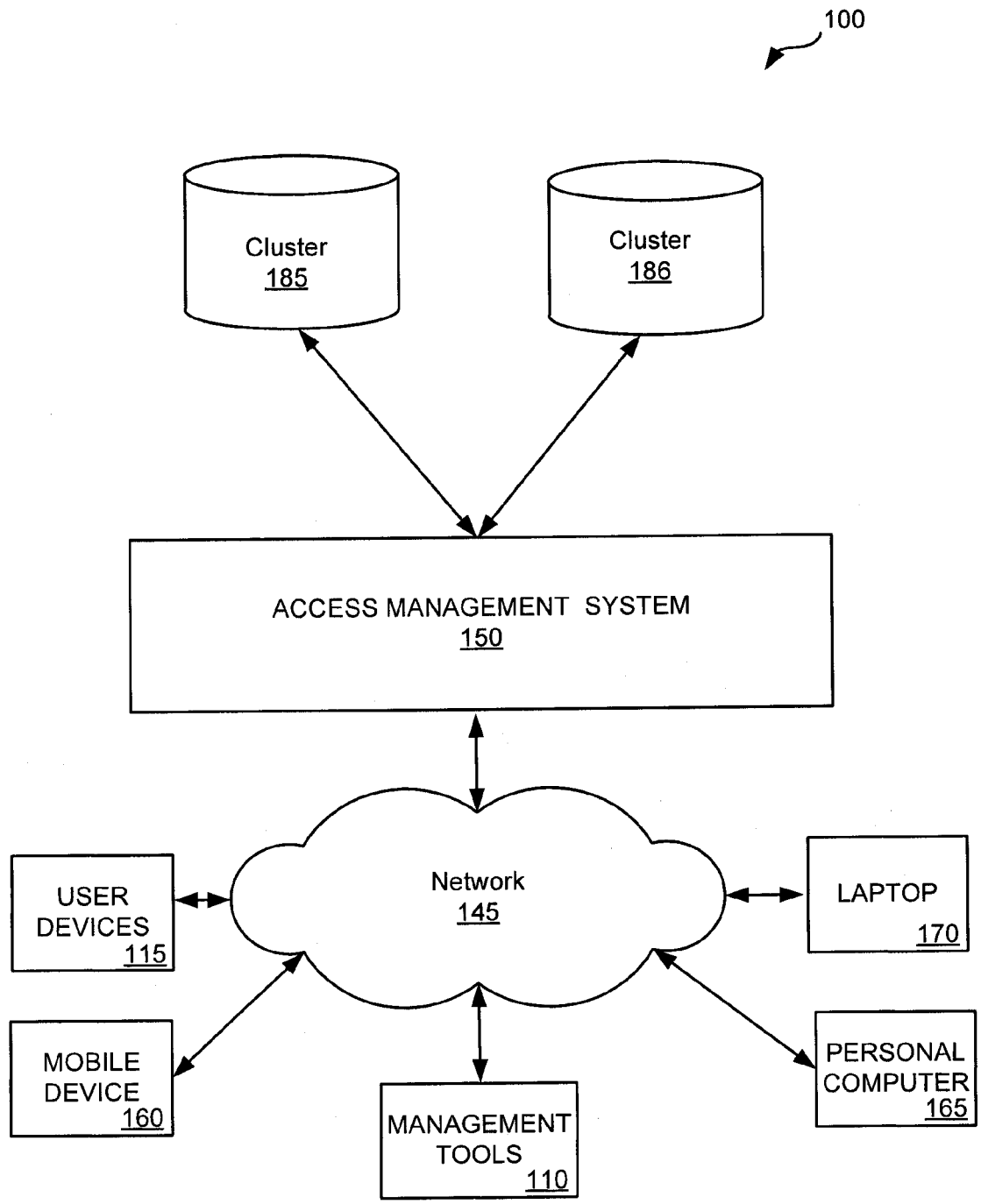
FIG. 1 depicts a block diagram of an example networked-based environment in which techniques for maintaining cache consistency across different regions can be implemented according to an embodiment of the present disclosure.

FIG. 1 illustrates an example of a networked-based environment 100 in which some embodiments of the present invention may be utilized. Companies can store a tremendous amount of data (e.g., photographs, messages, e-mails, electronic documents, or healthcare records) and related analytics (e.g., usage analytics). The data can be submitted through various management tools 110, user devices 115, mobile devices 160, personal computers 165, laptops 170, and/or other devices to allow the data to be stored on one or more databases in data clusters 185 and 186. As illustrated in FIG.

1, these devices and tools may use network 145 to submit and retrieve information from the clusters 185 and 186. Various embodiments of the present invention use access management system 150 to manage the access that the users (both end-users and employees) have to the information and data stored in clusters 185 and 186.

User device 115 can be any computing device capable of receiving user input as well as transmitting and/or receiving data via the network 145. In one embodiment, user device 115 is a conventional computer system, such as a desktop 165 or laptop computer 170. In another embodiment, user device 115 may be mobile device 160 having computer functionality, such as a personal digital assistant (PDA), mobile telephone, smart-phone or similar device. User device 115 is configured to communicate with access management system 150, and/or the financial account provider via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 208, such as 10S® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Figure 3A:
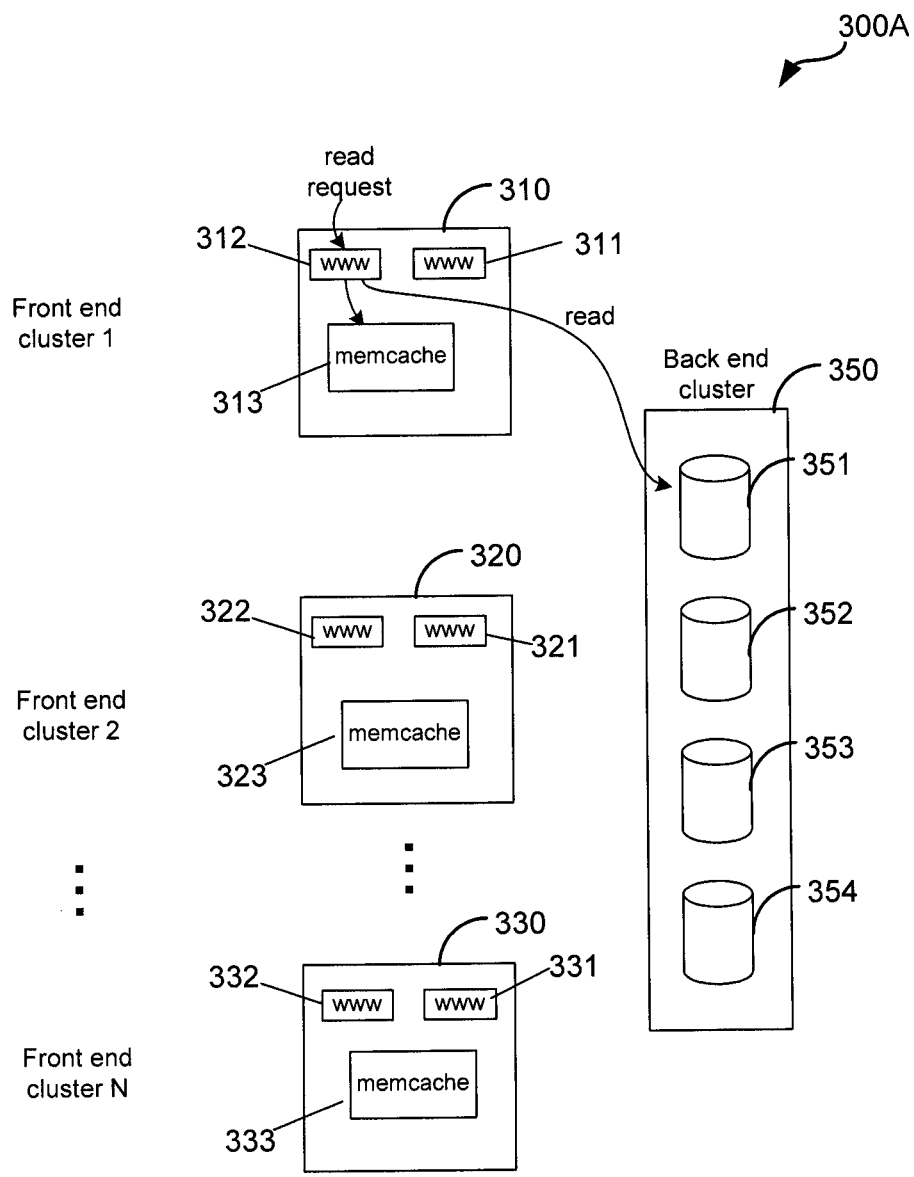
FIGS. 3A and 3B depict example scenarios in which a cluster responds to read and write requests.

A cluster can include up to thousands of machines available to store data. FIG. 3A depicts an example layout of components for one embodiment of a data cluster having multiple front end clusters and a backend cluster.

Memcache Leases

When a user requests data from the data clusters in the system, e.g., in the form of a webpage request to a social networking website, a local web server responds to the request. The local web server retrieves the requested data. The web server first checks the local memcache for the requested data by requesting the cached value corresponding to particular keys for the needed data. If the value of a requested key is not cached, the web server retrieves the value from a system database and then stores the key-value pair in the cache for subsequent data access. When a user makes a write request, the web server issues a SQL statement to the database and then sends a delete request to invalidate stale data stored in the cache.

Figure 2A:
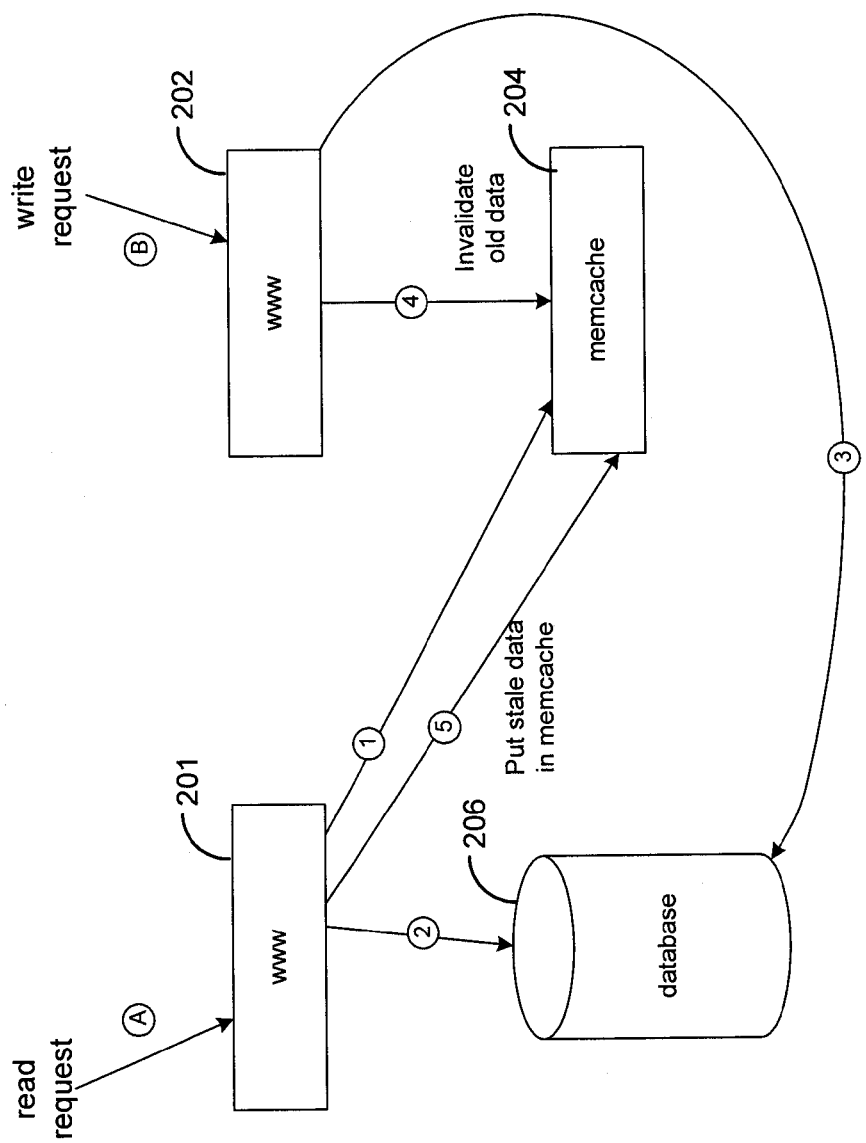
FIG. 2A depicts an example scenario in which implementing a memcache lease mechanism is advantageous.

Under certain circumstances, it is possible for a web server to set a value in memcache that is not the latest data for a particular key. In the example scenario depicted in FIG. 2A, read request A is made to web server 201. The web server 201 first checks whether the value for the key is stored in memcache 204 (step 1 in FIG. 2A). If not, the web server 201 retrieves the value from database 206 (step 2 in FIG. 2A). Meanwhile, a write request B is made to web server 202 for the same key. The web server 202 writes the value of the key to the database 206 (step 3 in FIG. 2A). The web server 202 then invalidates the old data stored in shared memcache 204 (step 4 in FIG. 2A) so that subsequent read requests for the value of the key do not return the old data.

At this point, web server 201 places a copy of the retrieved value in the memcache 204 (step 5 in FIG. 2A) so that subsequent read requests for the key can retrieve the value directly from memcache 204. However, because web server 201 retrieved the value of the key from the database 206 before web server 202 updated the value of the key, the data set by web server 201 in the memcache 204 is the old data. Subsequent requests for the value of the key will receive stale data from memcache 204.

To remedy this problem, a memcache lease mechanism can be used. The memcache 204 gives a lease to the web server to set data back into the cache when the web server has a cache miss, i.e., the value of the key is not found in the cache. The lease is in the form of a token and is bound to the specific key that the web server requested.

Figure 2B:
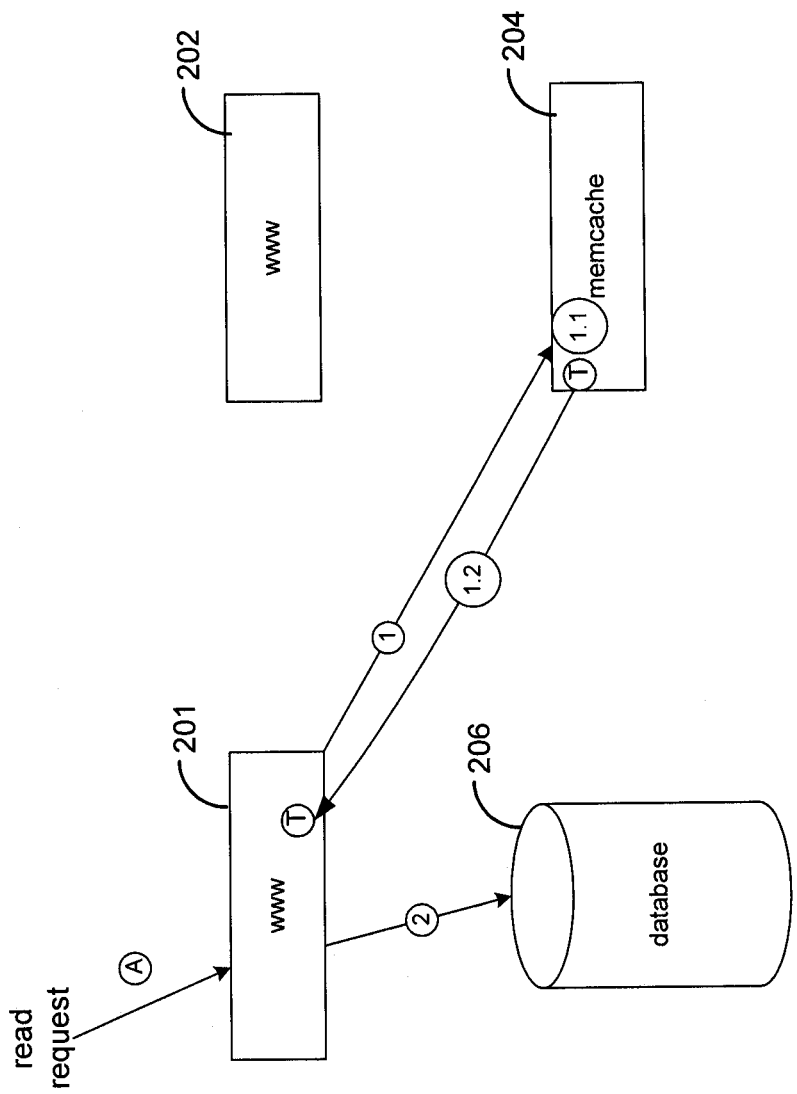
FIGS. 2B and 2C depict an example implementation of a memcache lease mechanism.
Figure 2C:
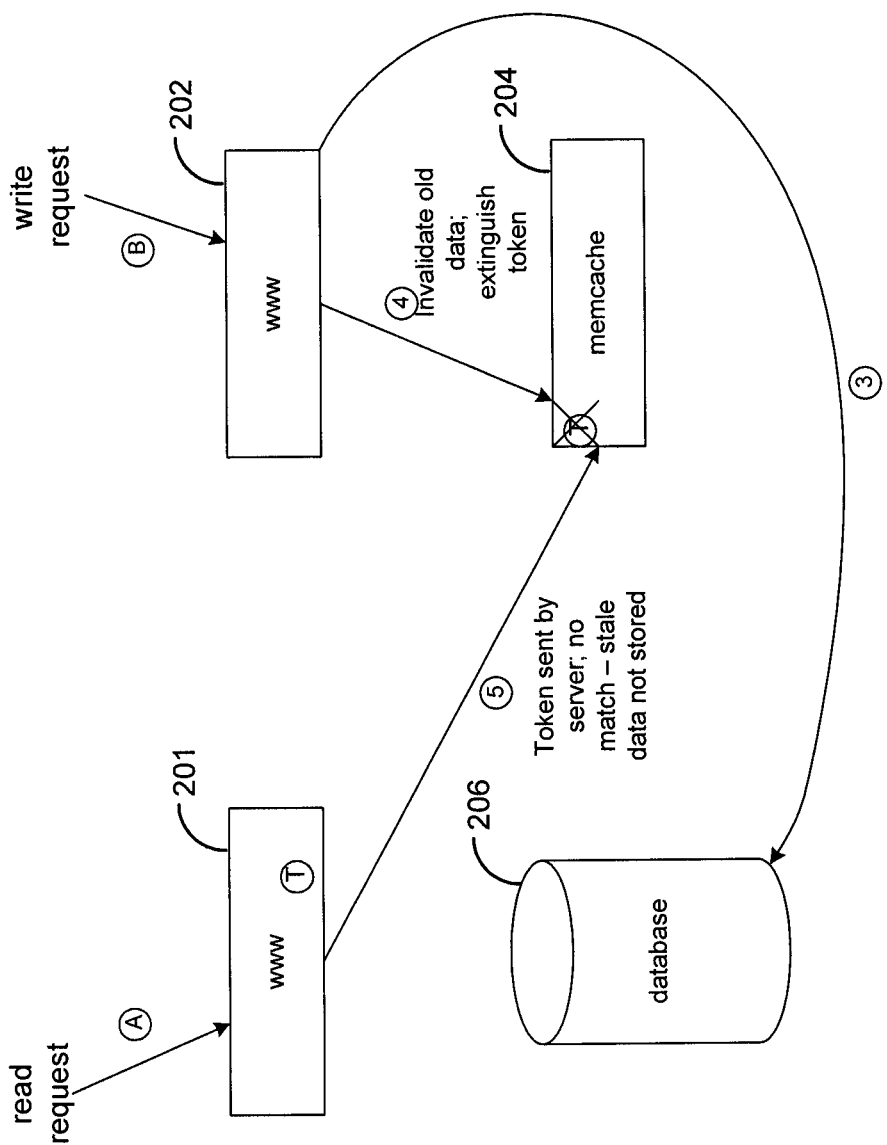

An example scenario that uses a memcache lease is depicted in FIGS. 2B and 2C. First, web server 201 receives a read request A and checks whether the value of the key is stored in memcache 204 (step 1 in FIG. 2B). If the value is not found in memcache 204, memcache 204 generates a token T that is bound to the specific key that the web server requested (step 1.1 in FIG. 2B). In one embodiment, the token is a 64-bit token. The memcache 204 sends the token to the web server 201 (step 1.2 in FIG. 2B). In order to set the value of that specific key in memcache 204, the web server 201 needs to provide the lease token to the memcache 204 with the value of the key that is retrieved from the database 206. The web server 201 retrieves the value from the database 206 (step 2 in FIG. 2B).

In this scenario, before the web server 201 is able to set the retrieved value in the memcache 204, web server 202 receives a write request B for the same key (FIG. 2C). So the web server 202 writes the new value for the key to the database 206 (step 3 in FIG. 2C). Then the web server 202 invalidates the old data stored in the memcache 204 and wipes out the token associated with the key (step 4 in FIG. 2C). Then if web server 201 subsequently tries to set the value of the key retrieved from the database 206 at step 2 by sending the retrieved value along with the token to the memcache 204 (step 5 in FIG. 2C), memcache 204 will try to validate the token. Only if the token is validated will memcache 204 set the received value of the key. In this case, because the token was extinguished at step 4 by web server 202 because the value of the key was updated in the database 206, memcache 204 cannot validate the token, and the retrieved value provided by web server 201 at step 5 is discarded. Thus, the memcache lease mechanism prevents stale data from being set in the memcache 204.

Figure 2D:
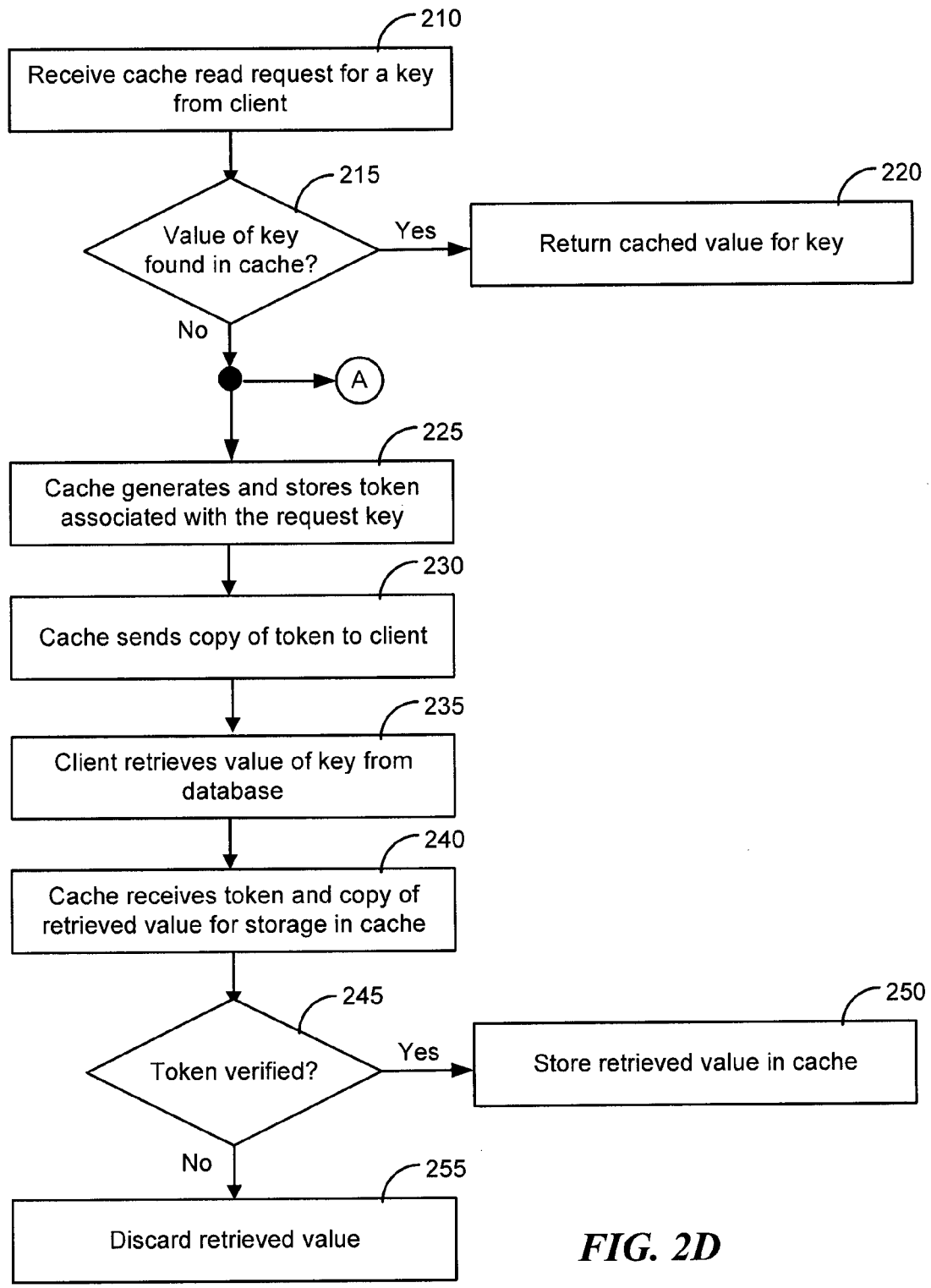
FIGS. 2D and 2E show a flow diagram illustrating an example process of implementing a memcache lease with a token.
Figure 2E:
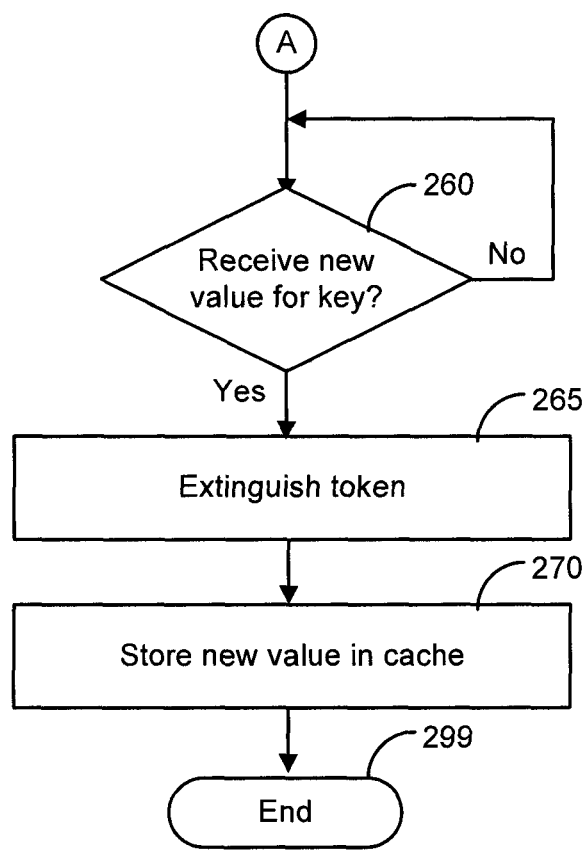

FIGS. 2D and 2E show a flow diagram illustrating an example process for implementing the memcache lease mechanism. At block 210, a cache read request is received from a client. Then at decision block 215, the system determines if the value of the key is stored in the cache. If the value of the key is found (block 215—Yes), at block 220 the cached value for the key is returned to the client.

If the value of the key is not found in the cache, i.e., a cache miss occurs (block 215—No), then two processes occur. In the first process, at block 225, the cache generates and stores a token associated with the requested key. Next, at block 230 a copy of the token is sent to the client.

The client then retrieves the value of the key from the database at block 235. Then at block 240, the cache receives the token and the retrieved value of the key from the client for storage in the cache.

At decision block 245, the cache determines if the token is verified, this is, if the token matches a stored token value in the cache. If the token is verified (block 245—Yes), at block 250 the retrieved value for the key is stored in the cache. If the token is not verified (block 245—No), at block 255 the cache discard the retrieved value and does not set it in the cache.

In the second process that occurs when there is a cache miss, at decision block 260 the cache determines if a new value for the key has been received without a corresponding token. If no new value is received (block 260—No), the process remains at block 260. If a new value is received (block 260—Yes), at block 265, the token is extinguished. Then at block 270, the new value is set in the cache. The process ends at block 299.

Data Cluster Architecture

FIG. 3A illustrates example elements in a single data cluster 300A. The databases 351, 352, 353, 354 in the data cluster are part of a backend cluster 350. The web servers 310, 320, 330 retrieve the data from the databases 351, 352, 353, 354 in the backend cluster 350 if the data is not available locally in cache.

Each front end cluster 310, 320, 330 has one or more web servers and a memcache among the web servers of the front end cluster. Only a single front end cluster is needed to respond to user requests to read data from and write data to the databases 351, 352, 353, 354 in the backend cluster 350. However, as user demand increases, the web servers and memcache instances can be split into multiple front end clusters. Web servers only retrieve cached data from within the local memcache in that front end cluster.

Thus, front end cluster 310 has web servers 311, 312 that can retrieve data from shared memcache 313; front end cluster 320 has web servers 321, 322 that can retrieve data from shared memcache 323; and front end cluster 330 has web servers 331, 332 that can retrieve data from shared memcache 333. While three front end clusters 310, 320, 330 are shown in FIG. 3A, any number of front end clusters can be used within the single data cluster 300A. Further, all of the front end clusters 310, 320, 330 and the backend cluster 350 are within one local region. Data clusters located across different regions will be discussed below.

As shown in FIG. 3A, and consistent with the description above, when a read request is sent to a web server 312, the web server 312 first checks memcache 313 for the key corresponding to the requested data. If a value for the key is not found, the web server 312 retrieves the value from database 351 in the backend cluster 350.

Figure 3B:
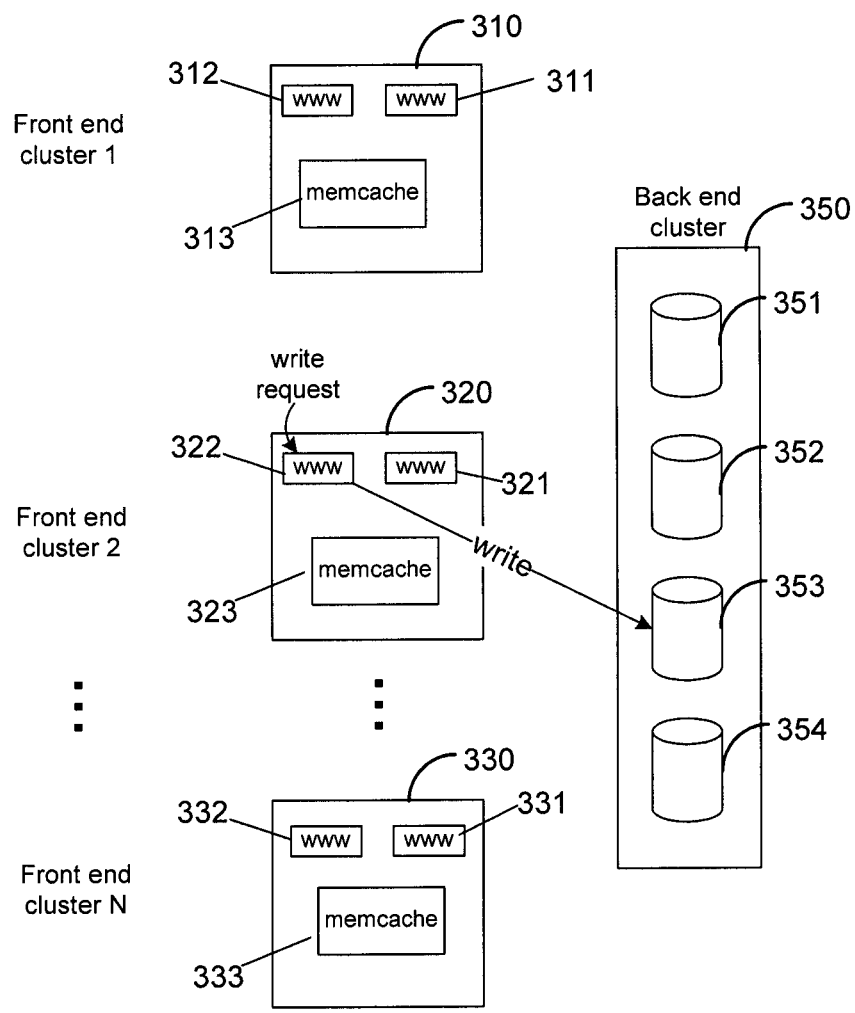

FIG. 3B depicts a scenario in which a write request is sent to web server 322. In response, the web server 322 writes the new data for the particular key directly to the database 353 in the backend cluster 350. The old value corresponding to the key may be stored in one or more of the memcaches 313, 323, 333 in the front end clusters 310, 320, 330. Thus, the web server 320 that received the write request deletes the value stored for the key in its memcache 323 and sends out invalidations to the other memcaches 313, 333 in the cluster 300A to delete their stored values for the key.

Appending Invalidations on MySQL Statements

Figure 4A:
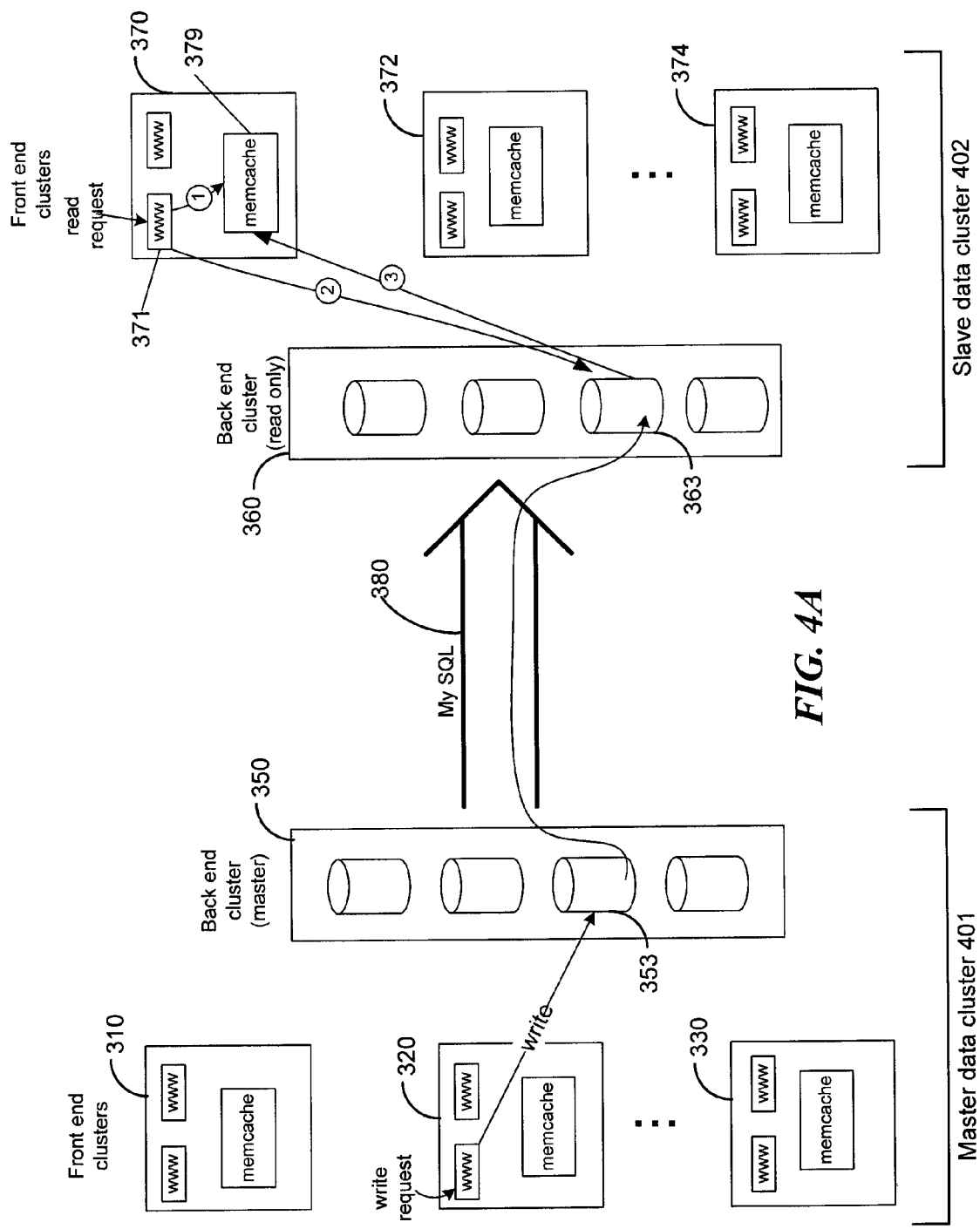
FIGS. 4A and 4B depict an example architecture for a master data cluster and a slave data cluster and an example of how data is replicated from the master data cluster to the slave data cluster.

When users from widely separated geographic regions want to access the data stored in a data cluster, it is advantageous to deploy replicas of the data cluster in different regions to reduce the latency experienced by users when requesting data. Each replica database has an architecture similar to the first or master data cluster as depicted in FIG. 3A. FIG. 4A shows an example diagram of two data clusters in the system, a master data cluster 401 and a slave data cluster 402. Similar to the master data cluster 401, the slave data cluster 402 has one or more front end clusters 370, 372, 374 and slave databases that are part of a back end cluster 360. Web servers experience lower latency when accessing data in either the local cache or the local database replicas. Although only one slave data cluster 402 is shown in FIG. 4A, more than one slave data cluster can be established.

The databases in the back end cluster 360 of the slave data cluster 402 are read-only databases that are replicas of the master databases in the back end cluster 350 of the master data cluster 401. In one embodiment, the databases in the backend clusters 350, 360 are running a MySQL relational database management system, and a MySQL replication mechanism is used to update the replica slave databases as changes are made to the master databases.

In the example scenario depicted in FIG. 4A, when a write request is received by front end cluster 320 in the master data cluster 401, the web server writes the new data to master database 353 in the master back end cluster 350. Then a MySQL replication statement 380 is sent from the master database 353 to the corresponding slave database 363 in the back end cluster 360 to replicate the new data in the slave data cluster 402. Meanwhile, the web server 320 invalidates the old data stored in the memcaches in the front end clusters 310, 320, 330, 370, 372, 374 in both the master data cluster 401 and the slave data cluster 402.

However, it is possible that the invalidations of the old data in the memcaches in the front end clusters 310, 320, 330, 370, 372, 374 may occur before the new data has been replicated in the slave database 363. In this case, if a read request for the data is received at web server 371 in front end cluster 370 in the slave data cluster 402, the web server 371 will first check local memcache 379 (step 1 in FIG. 4A) and not find a value of the key for the data because the old data value has been invalidated. Then the web server 371 will retrieve the data from database 363 (step 2 in FIG. 4A) which has not yet been updated with the new value from the master database 353. Finally, the web server 371 will set the retrieved (old) data in memcache 379 (step 3 in FIG. 4A). Thus, the web server 371 has put the old data back into cache, and the next user to request the data from front end cluster 370 will receive the old value stored in cache. In this scenario, it is the web server's responsibility to invalid the old data stored in cache.

Figure 4B:
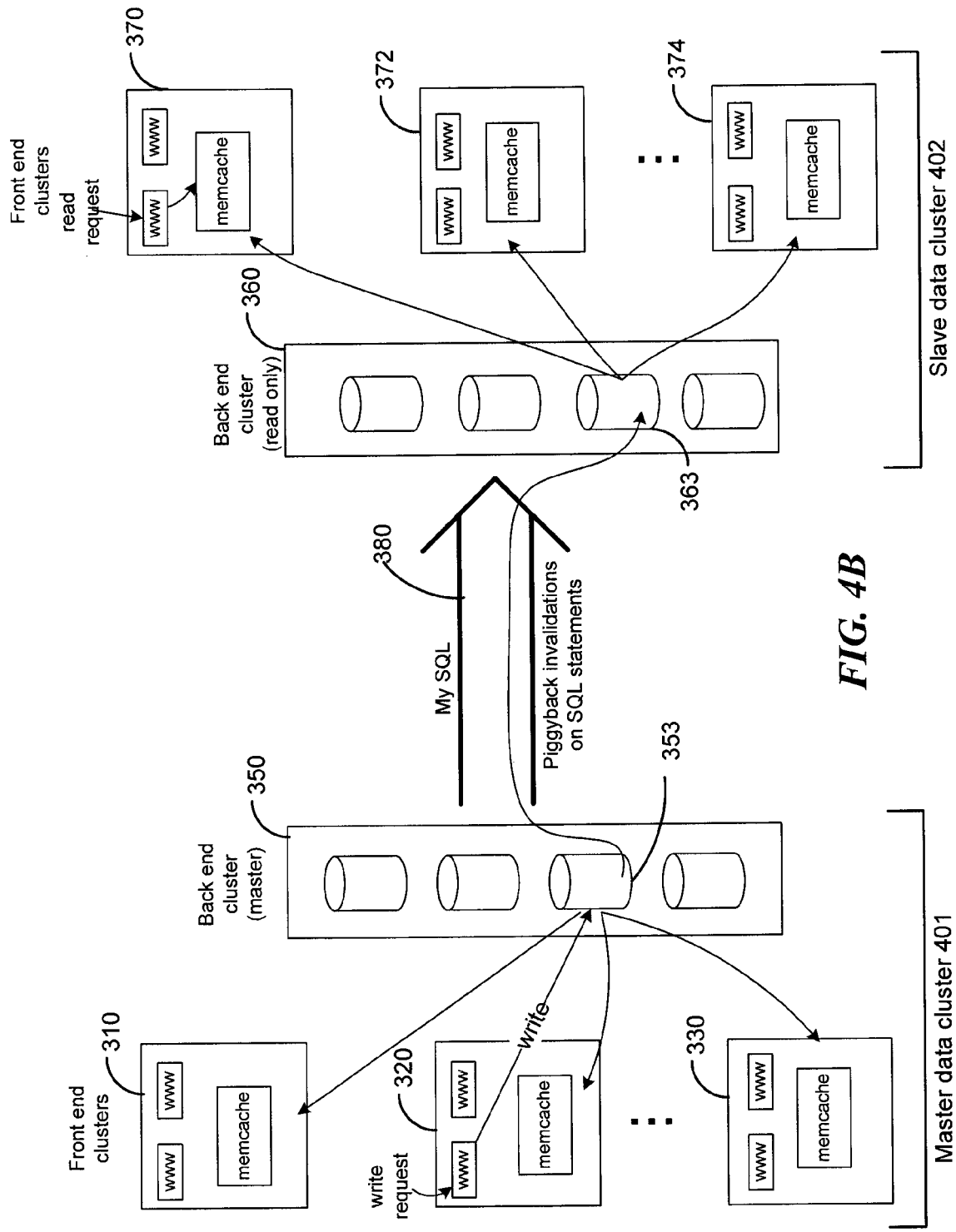

It would be beneficial to delay the invalidations of the old value in cache until the replication of the updated value in the slave database has occurred. This can be done by appending the invalidations on the MySQL replication statement 380 used to update the slave database 363. In one embodiment, the grammar of the MMySQL replication statement is modified to allow invalidations for cache key values to be appended. Then the updated slave database 363 is responsible for sending out the invalidations to the memcaches in the front end clusters 370, 372, 374 in the slave data cluster 402, as shown in FIG. 4B, rather than the web server. Further, the database 353 to which the new value was written in response to the user write request is responsible for sending out invalidations to the memcaches in the front end clusters 310, 320, 330 in the master data cluster 401 to delete stored old values.

FIG. 4B depicts a solution for the timing of the invalidations when a write request is received in the master data cluster 401. Now if a write request is received in the slave data cluster 402, the data must first be written to the master database in the master data cluster 402 because the slave databases are read-only replicas. Once the data is written to the master database, there is some lag before the data is replicated in the slave database. Meanwhile, if a user modifies data on a webpage, the user may reload the webpage to confirm that the data was successfully modified. Since reloading the webpage is a read request, the data is reloaded from the slave database, but because the replication has not yet arrived at the slave database, data retrieved from the cache and/or the slave database does not reflect the user's changes. Thus, the user may see the old data upon reloading the webpage.

Regional Markers

Figure 5A:
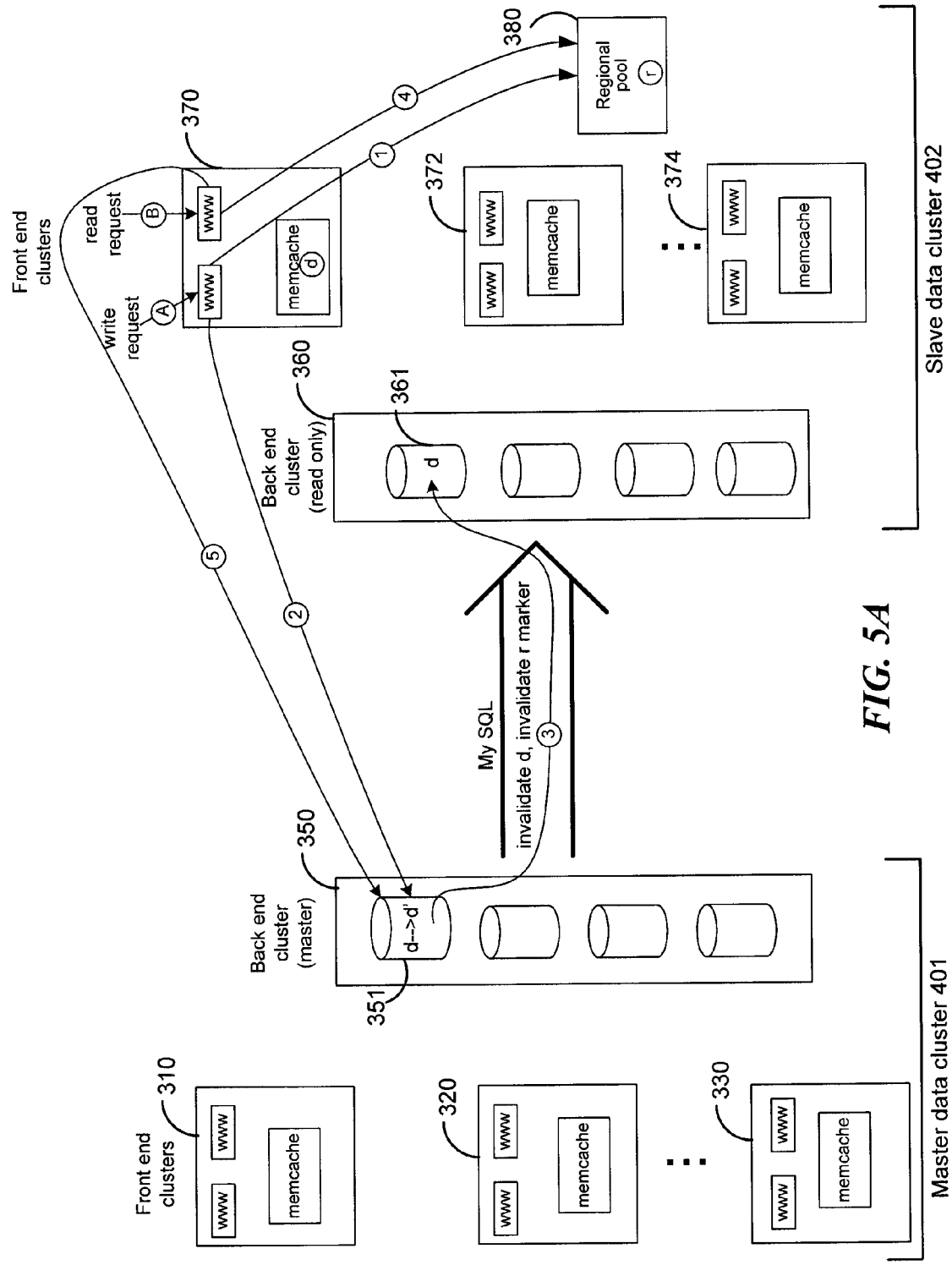
FIG. 5A shows an example scenario where a marker for a key is used in a non-master region to indicate that data in the local database may be stale.

The solution to improving the experience of users whose requests are served from a non-master region is to use a marker associated with the key of the data modified by the user. FIG. 5A shows an example scenario where a marker for a key is used in a non-master region to indicate that data in the local database may be stale. When a web server in the slave data cluster 402 receives a write request A to modify stored value d to value d' for the key k, the web server first generates and sets a remote marker r associated with the key k in regional pool 380 for the slave data cluster 402 (step 1 in FIG. 5A). The marker is a flag that signifies to web servers in the region that if the value for the key k is needed, the data in the local databases and caches may be stale, and the current value for the key should be retrieved from the master back end cluster 401.

Then the web server writes the new data d' to the master database 351 in the master back end cluster 350 (step 2 in FIG. 5A). The web server also includes the key k and the marker r so that the invalidations for the old value d in cache and the marker r for the key k can be embedded in the MySQL statement sent to the slave database (step 3 in FIG. 5A). When the slave database 361 receives the MySQL statement, it sends out invalidations to the front end servers 370, 372, 374 to delete the old value d in the memcache. The slave database 361 also sends an invalidation for the marker r to the regional pool 380 so that web servers no longer find this flag when looking to retrieve the value for the key k.

If a read request B for the value for key k is received at a web server before the slave database receives the MySQL replication statement with embedded invalidations, the web server will first check the regional pool for a marker for the key (step 4 in FIG. 5A). Because the marker r was set for the key k in the regional pool 380, the web server will automatically go to the master back end cluster 350 to retrieve the current value of the key k (step 5 in FIG. 5A). Thus, with the marker mechanism, the user with the read request B will receive the updated value d' for the key k.

If the read request B for the value for key k is received at the web server after the slave database receives the MySQL replication statement, the value d will have been updated to d' in the slave database 361, old value d stored in the local caches will have been invalidated, and the marker r will also have been deleted. Then the web server will not find the marker r and will simply retrieve the data d' from the slave database because it is not stored in cache.

Figure 5B:
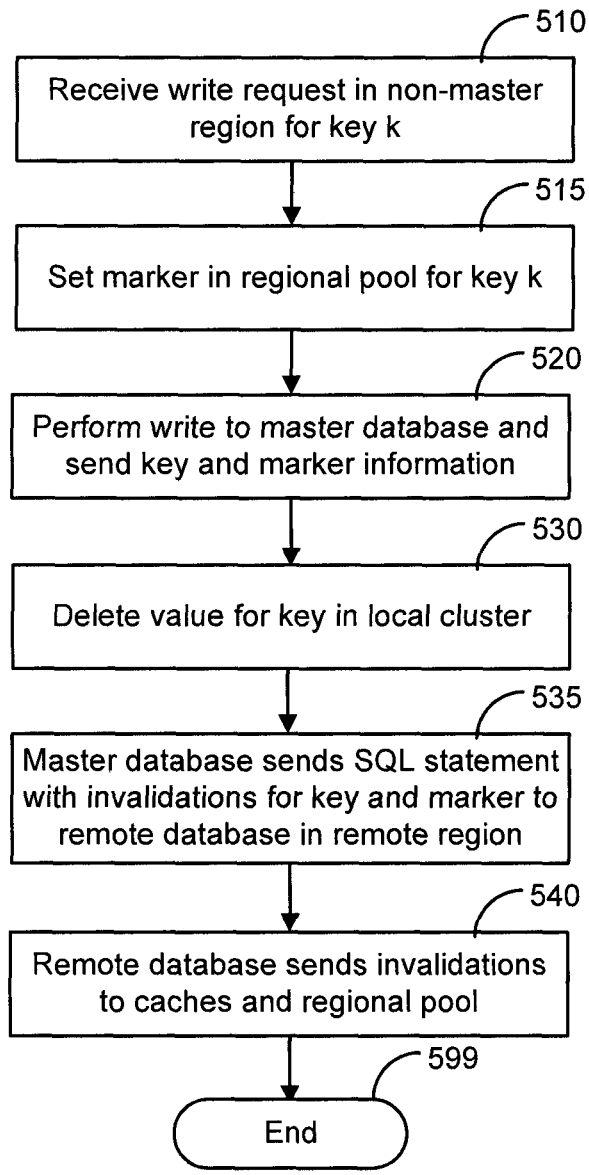
FIGS. 5B and 5C depict a flow diagram illustrating an example process of using a marker and transmitting invalidations for a key and marker with MySQL replication statements.

FIG. 5B shows a flow diagram illustrating an example process for implementing a write request when key markers are used and sending invalidations with SQL statements for updating a remote database. At block 510, a write request for a key k is received by a web server in a remote region distinct from the master database. Then at block 515, the system sets a marker for the key k in the regional pool in the remote region.

Next, at block 520, the web server performs a write to the master database and also sends the key k and the marker for the key to the master database. The web server deletes the value for key k in the local cluster at block 530.

Then at block 535, the master database sends an SQL statement with invalidations for the key k and corresponding marker to the read-only database in the remote region. And at block 540, the remote database sends the invalidations for the key value to the caches and the invalidation for the marker to the regional pool. The process ends at block 599.

Figure 5C:
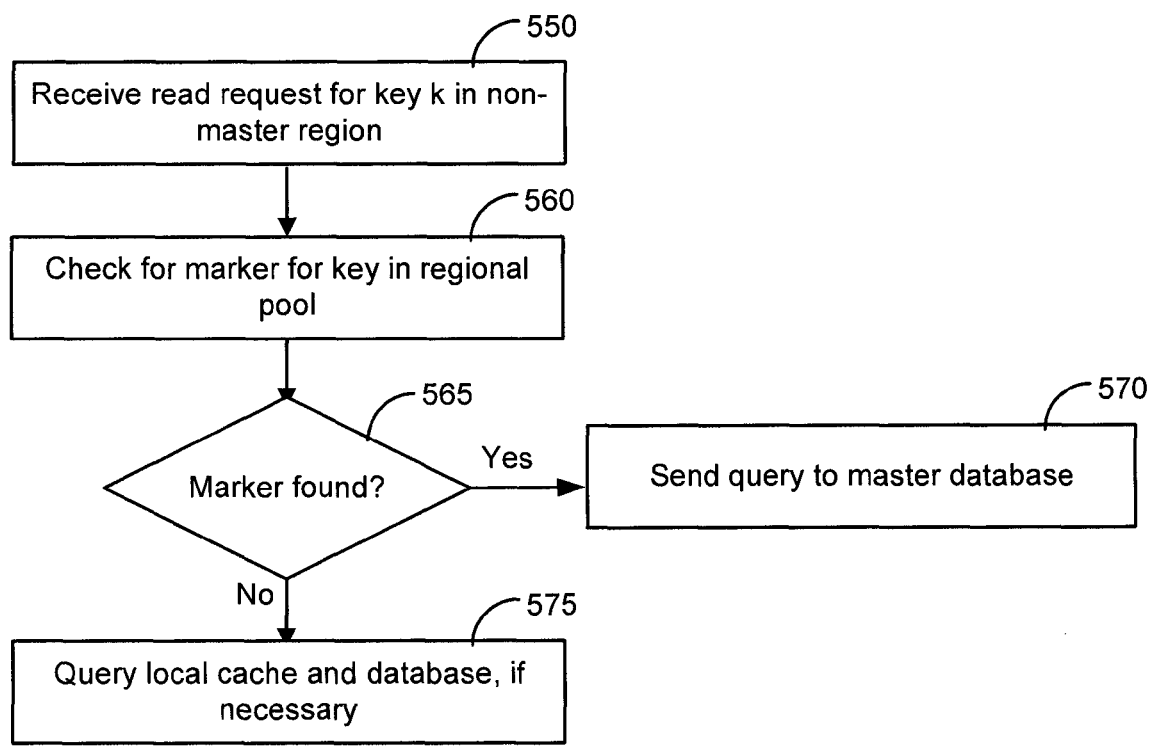

FIG. 5C shows a flow diagram illustrating an example process for implementing a read request when key markers are used. At block 550, a read request for a key k is received by a web server in a remote region distinct from the master database. Then at block 560, the web server checks for an associated marker for the key k in the regional pool.

At decision block 565, the web server determines if a marker for the key k is found. If the marker is found (block 565—Yes), at block 570 the web server sends a query to the master database for the value of the key. If the marker is not found (block 565—No), at block 575 the web server queries the local cache for the value of the key and the local database if the value is not found in cache.

Out-of-Band Invalidations

Figure 6A:
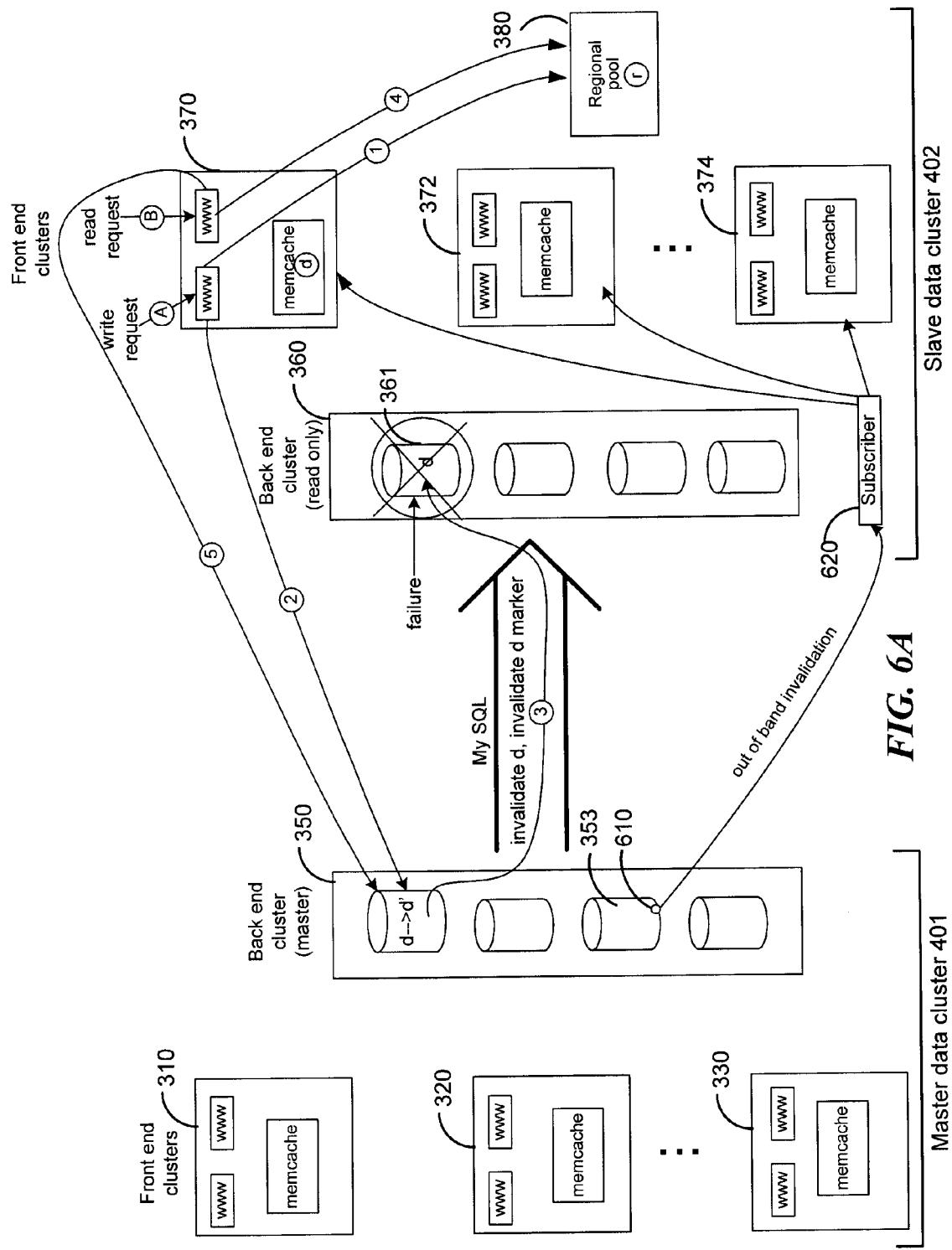
FIG. 6A shows an example scenario where out-of-band invalidations are implemented with a publish-subscribe system.

If a slave database has a failure, when the master database sends a MySQL replication statement appended with invalidations to the failed database, the failed database cannot update data nor send out invalidations. FIG. 6A shows a stopgap measure for preventing users in a non-master region from getting stale data when the slave database is down. The stopgap measure uses a publish-subscribe system to publish out-of-band invalidations from the master data cluster 401 to a subscriber 620 in the remote slave data cluster 402. Then the subscriber takes over part of the role of the failed database by sending the invalidations out to the front end clusters 370, 372, 374 in the region.

In the back end cluster 350 of the master data cluster 401, a wormhole module 610 pretends to be a MySQL database and receives a stream of MySQL replication statements along with embedded invalidation keys and markers that are sent by the master databases in the back end cluster 350 to replica databases. The wormhole module 610 maintains a log of the replication statements and invalidations.

When a system administrator identifies a database in the non-master region that has failed, the wormhole module 610 is notified. At this point, the wormhole module 610 extracts the invalidations intended for the failed database and publishes the invalidations to the subscriber 620 located in the region where the failed database resides. The subscriber 620 then sends the received invalidations to the front end servers 370, 372, 374 in the slave data cluster 402. Thus, as long as the failed database is not running, the wormhole module 610 will send the invalidations intended for the failed database to the subscriber 620 so that the caches in the affected region do not store stale data that may be accessed by users.

Figure 6B:
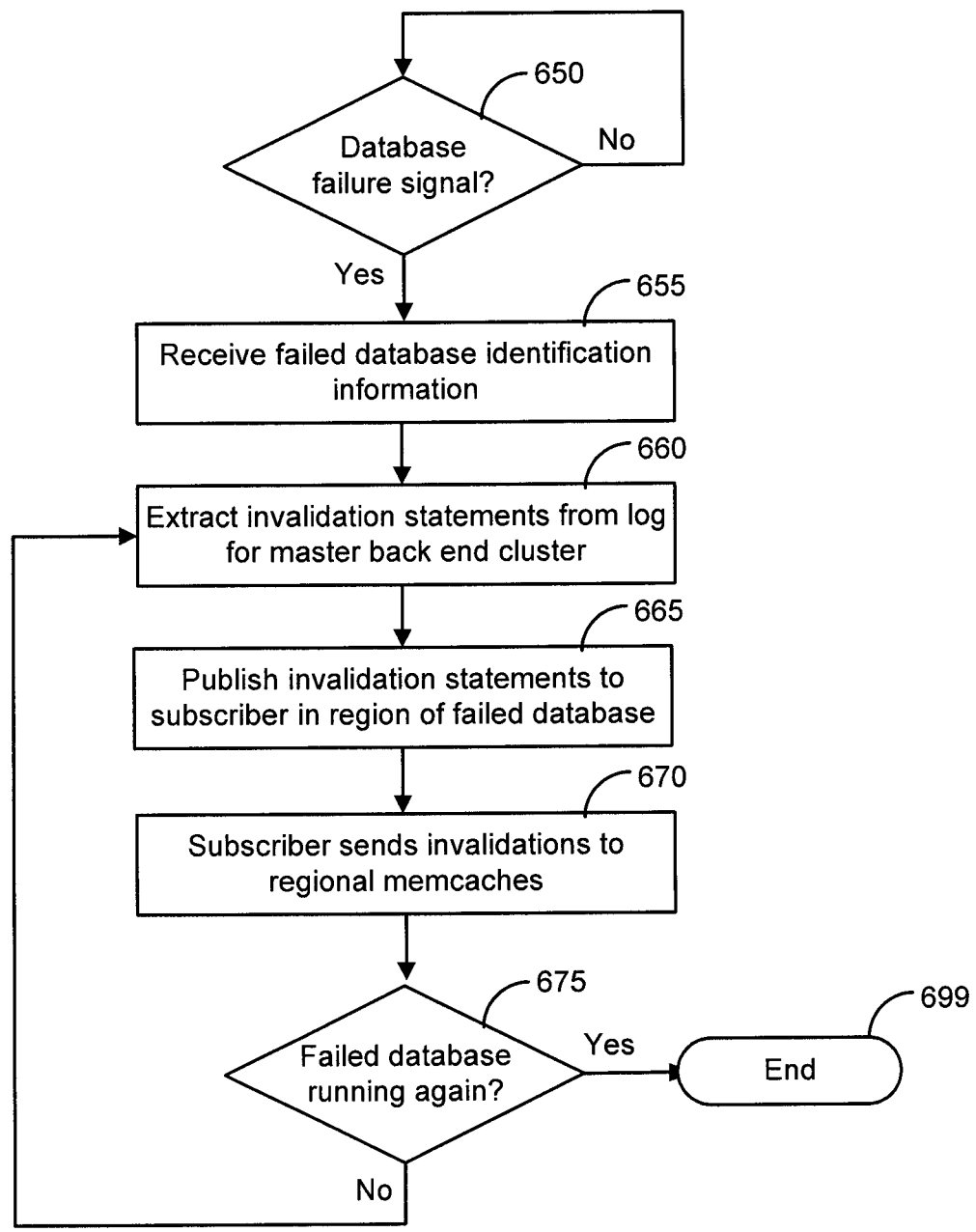
FIG. 6B depicts a flow diagram illustrating an example process of using a publish-subscribe system to send out-of-band invalidations to a non-master region with a failed database.

FIG. 6B shows a flow diagram illustrating an example process for sending out-of-band invalidations from the master data cluster to the memcaches in a remote region. At decision block 650, the system determines if a database failure signal has been received. If no signal is received (block 650—No), the process remains at decision block 650.

If a database failure signal is received (block 650—Yes), at block 655 the system receives the identification information for the failed database. The information can include the region in which the failed database is located and the particular database.

Then at block 660, the system extracts invalidation statements from a log that stores all SQL replication statements sent from the master back end cluster to remote database clusters for replicating data changes. Next, at block 665, the system publishes the invalidation statements to a subscriber located in the region of the failed database.

The subscriber then sends invalidations to each of the memcaches in the region to delete stale data stored in the caches. The subscriber also sends invalidations to the regional pool for invalid markers.

At decision block 675, the system determines if a signal has been received that the failed database is running again. If the failed database is still down (block 675—No), the process returns to block 660. If the failed database is running again (block 675—Yes), the process ends at block 699 because the failed database can send the invalidations to the memcaches in the region and the regional pool and does not need to rely on the out-of-band publish-subscribe mechanism.

Cluster Component Architectures

Figure 7A:
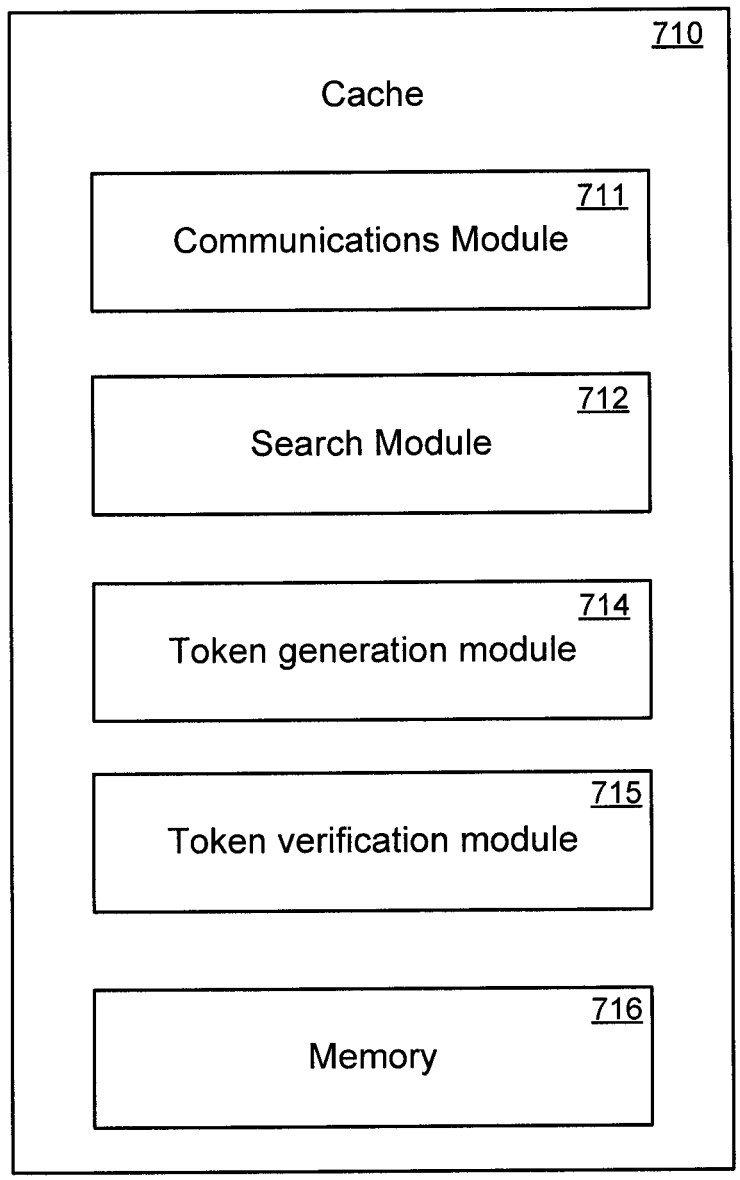
FIG. 7A depicts an example architecture of a cache according to an embodiment of the present disclosure.

FIG. 7A depicts an example architecture of a cache 710 configured, for example, to receive requests for data stored in the cache. In the example of FIG. 7A, the cache 710 (and all of the elements included within the cache 710), is implemented by using programmable circuitry programmed by software and/or firmware, or by using special-purpose hardwired circuitry, or by using a combination of such embodiments.

In the example of FIG. 7A, the cache 710 includes a communications module 711, a search module 712, a token generation module 714, a token verification module 715, and a memory 716. Additional or fewer components or modules can be included in the cache 710 and each illustrated component.

As used herein, a "module" includes a general purpose, dedicated or shared processor and, typically, firmware or software modules that are executed by the processor. Depending upon implementation-specific or other considerations, the module can be centralized or its functionality distributed. The module can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, the cache 710 includes a communications module 711 configured to receive requests for the value of a key stored in the memory 716 or to set the value of a key to the memory 716. The communications module 711 is also configured to send a generated token to the web server and receive a token for verification along with a data value for setting in memory for a particular key. The communications module 711 is further configured to receive invalidations for particular keys from the database.

In one embodiment, the cache 710 includes a search module 712 configured to search through the memory 716 to determine whether a requested value for a key is stored in the cache. The search module 712 is also configured to search for a token associated with a particular key when requested to set a value for the key. If the token is in memory for the particular key, the search module 712 extinguishes the token. Further, the search module 712 is configured to search for a particular key received from the database to delete the value for the key stored in the memory 716.

In one embodiment, the cache 710 includes a token generation module 714 configured to generate a token associated with a specific key whose value is requested by a web server when the cache does not have a value for the key stored in the memory 716. The token can be, for example, a 64-bit token.

In one embodiment, the cache 710 includes a token verification module 715 configured to verify a token from a web server with a data value for setting in the cache memory 716 for a particular key to determine whether to set the value in memory 716 or to discard the data. If the token is stored in memory, the token is verified, and the data value is set for the particular key. If the token has been extinguished, the data is discarded.

In one embodiment, the cache 710 includes a memory 716 configured to store values of keys and tokens along with their associated keys. The information stored in the memory 716 can be used by the other modules in the cache 710.

Figure 7B:
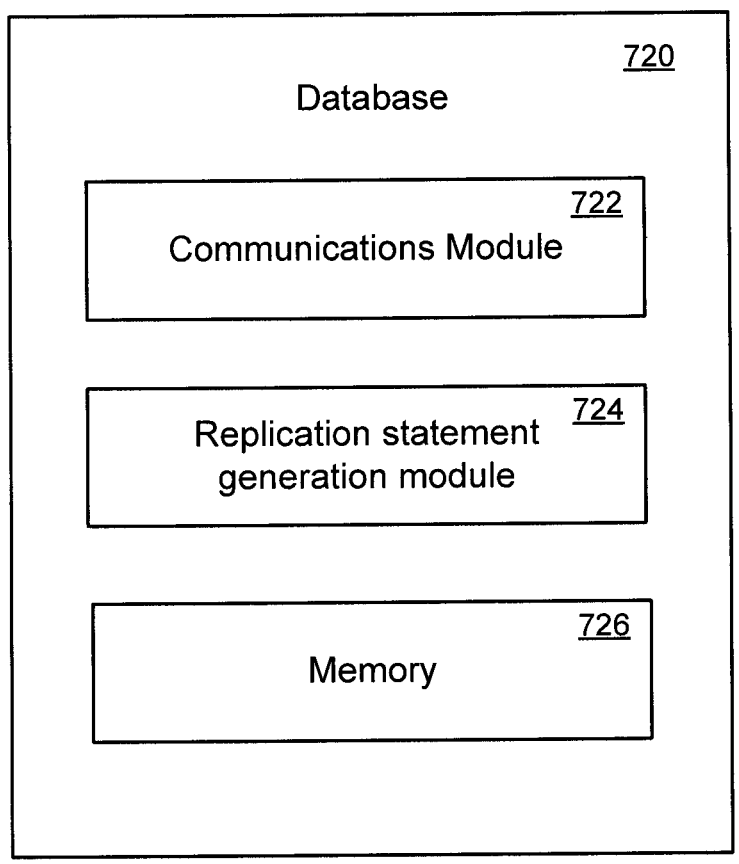
FIG. 7B depicts an example architecture of a database according to an embodiment of the present disclosure.

FIG. 7B depicts an example architecture of a database 720 configured, for example, to store data and update data. In the example of FIG. 7B, the database 720 (and all of the elements included within the database 720), is implemented by using programmable circuitry programmed by software and/or firmware, or by using special-purpose hardwired circuitry, or by using a combination of such embodiments.

In the example of FIG. 7B, the database 720 includes a communications module 722, a replication statement generation module 724, and a memory 726. Additional or fewer components or modules can be included in the database 720 and each illustrated component.

In one embodiment, the database 720 includes a communications module 722 configured to receive requests for data stored in the memory 726 and requests to write data to the memory 726. The communications module 722 is also configured to send replication statements with invalidations to a corresponding replica database.

In one embodiment, the database 720 includes a replication statement generation module 724 configured to generate a replication statement for replicating the data in the master database for sending to a corresponding slave database. In one embodiment, the replication statement is a MySQL replication statement. The MySQL replication statement uses modified grammar that allows invalidations for keys to be appended to the replication statement.

In one embodiment, the database 720 includes a memory 726 configured to store data and also replication statements and appended invalidations. The information stored in the memory 726 can be used by the other modules in the database 720.

Figure 7C:
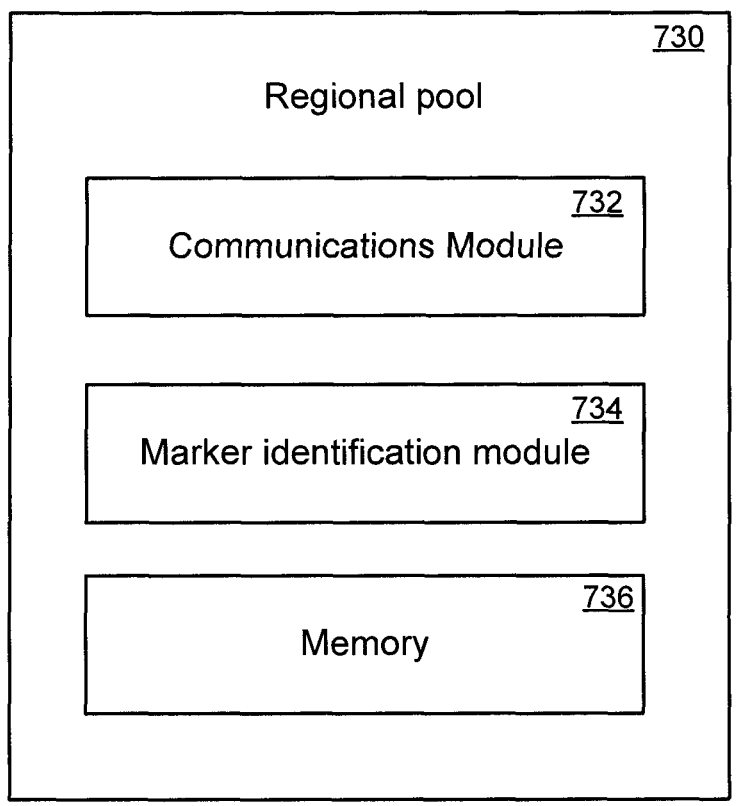
FIG. 7C depicts an example architecture of a regional pool according to an embodiment of the present disclosure.

FIG. 7C depicts an example architecture of a regional pool 730 configured, for example, to receive from a web server a marker associated with a key. In the example of FIG. 7C, the regional pool 730 (and all of the elements included within the regional pool 730), is implemented by using programmable circuitry programmed by software and/or firmware, or by using special-purpose hardwired circuitry, or by using a combination of such embodiments.

In the example of FIG. 7C, the regional pool 730 includes a communications module 732, a marker identification module 734, and a memory 736. Additional or fewer components or modules can be included in the regional pool 730 and each illustrated component.

In one embodiment, the regional pool 730 includes a communications module 732 configured to receive a marker associated with a specific key from a web server for storage. The communications module 732 is also configured to receive queries regarding whether a marker for a particular key is stored in the regional pool memory 736 and to respond to the queries.

In one embodiment, the regional pool 730 includes a marker identification module 734 configured to determine whether there is a marker associated with a particular key stored in the regional pool memory 736.

In one embodiment, the regional pool 730 includes a memory 736 configured to store markers and their associated keys. The information stored in the memory 736 can be used by the other modules in the regional pool 730.

Figure 7D:
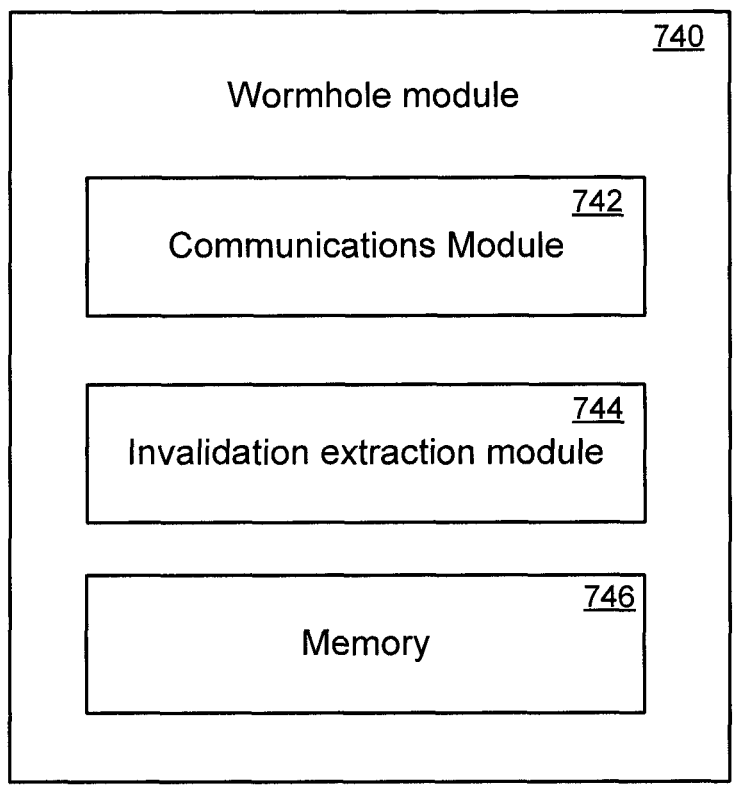
FIG. 7D depicts an example architecture of a wormhole module according to an embodiment of the present disclosure.

FIG. 7D depicts an example architecture of a wormhole module 740 configured, for example, to store MySQL replication statements and appended invalidations sent from the back end cluster of the master data cluster and extract appropriate invalidations for publishing to a subscriber in the region of a failed database. In the example of FIG. 7D, the wormhole module 740 (and all of the elements included within wormhole module 740), is implemented by using programmable circuitry programmed by software and/or firmware, or by using special-purpose hardwired circuitry, or by using a combination of such embodiments.

In the example of FIG. 7D, the wormhole module 740 includes a communications module 742, an invalidation extraction module 744, and a memory 746. Additional or fewer components or modules can be included in the wormhole module 740 and each illustrated component.

In one embodiment, the wormhole module 740 includes a communications module 722 configured to receive MySQL replication statements and appended invalidations sent by the master back end cluster. The wormhole module 70 is also configured to receive identification information of a failed database and to publish invalidations to a subscriber located in the region of a failed database.

In one embodiment, the wormhole module 740 includes an invalidation extraction module 744 configured to extract invalidations from a log of MySQL statements and invalidations intended to be sent to the failed database.

In one embodiment, the wormhole module 740 includes a memory 746 configured to store a log of MySQL statements and invalidations sent from the master back end cluster databases to replica databases in other regions. The information stored in the memory 746 can be used by the other modules in the wormhole module 740.

Figure 7E:
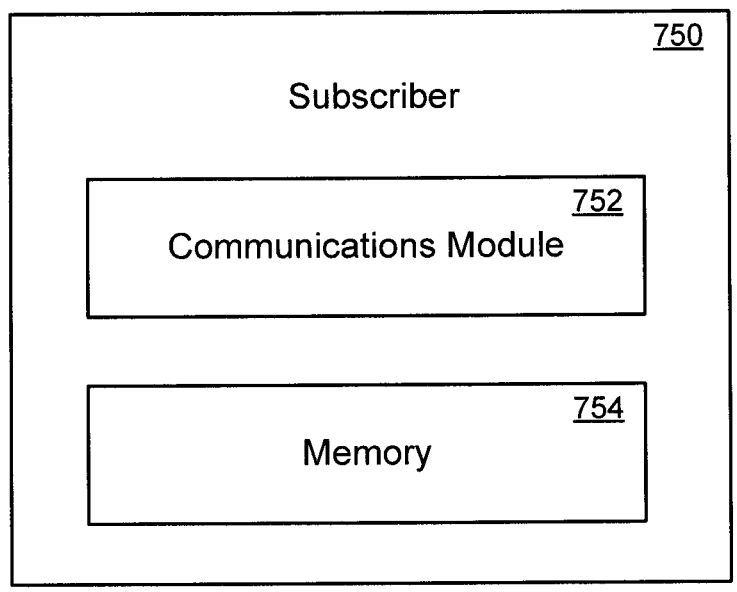
FIG. 7E depicts an example architecture of a subscriber according to an embodiment of the present disclosure.

FIG. 7E depicts an example architecture of a subscriber 750 configured, for example, to receive invalidations published by a wormhole module 740 and send the invalidations to the front end clusters. In the example of FIG. 7E, the subscriber 750 (and all of the elements included within the subscriber 750), is implemented by using programmable circuitry programmed by software and/or firmware, or by using special-purpose hardwired circuitry, or by using a combination of such embodiments.

In the example of FIG. 7E, the subscriber 750 includes a communications module 752, and a memory 754. Additional or fewer components or modules can be included in the subscriber 750 and each illustrated component.

In one embodiment, the subscriber 750 includes a communications module 752 configured to receive invalidations published by the wormhole module 740 and to send the received invalidations to the front end clusters in the region.

In one embodiment, the subscriber 750 includes a memory 754 configured to store invalidations published by the wormhole module 740. The information stored in the memory 754 can be used by the other modules in the subscriber 750.

Figure 7F:
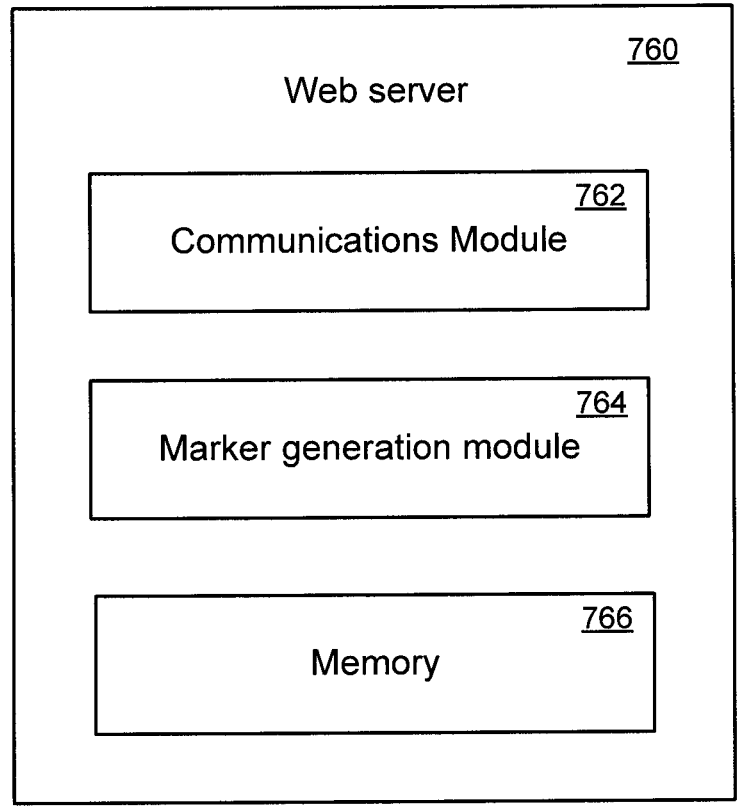
FIG. 7F depicts an example architecture of a web server according to an embodiment of the present disclosure.

FIG. 7F depicts an example architecture of a web server 760 configured, for example, to receive read and write requests from users. In the example of FIG. 7F, the web server 760 (and all of the elements included within the web server 760), is implemented by using programmable circuitry programmed by software and/or firmware, or by using special-purpose hardwired circuitry, or by using a combination of such embodiments.

In the example of FIG. 7F, the web server 760 includes a communications module 762, a marker generation module 764, and a memory 766. Additional or fewer components or modules can be included in the web server 760 and each illustrated component.

In one embodiment, the web server 760 includes a communications module 762 configured to receive read and write requests from a user. The communications module 762 is also configured to send a generated marker to a regional pool if the web server 760 serves users in a non-master region.

In one embodiment, the web server 760 includes a marker generation module 764 if the web server 760 serves users in a non-master region. The marker generation module 764 is configured to generate a marker associated with a particular key when a user requests that the value for the key be updated.

In one embodiment, the web server 760 includes a memory 766 configured to store generated markers. The information stored in the memory 766 can be used by the other modules in the web server 760.

Social Networking System Architecture

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, manufacturers. The social networking system allows its users to interact with each other as well as with other objects maintained by the social networking system. In some embodiments, the social networking system allows users to interact with third-party websites and financial account providers.

Based on stored data about users, objects and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 8:
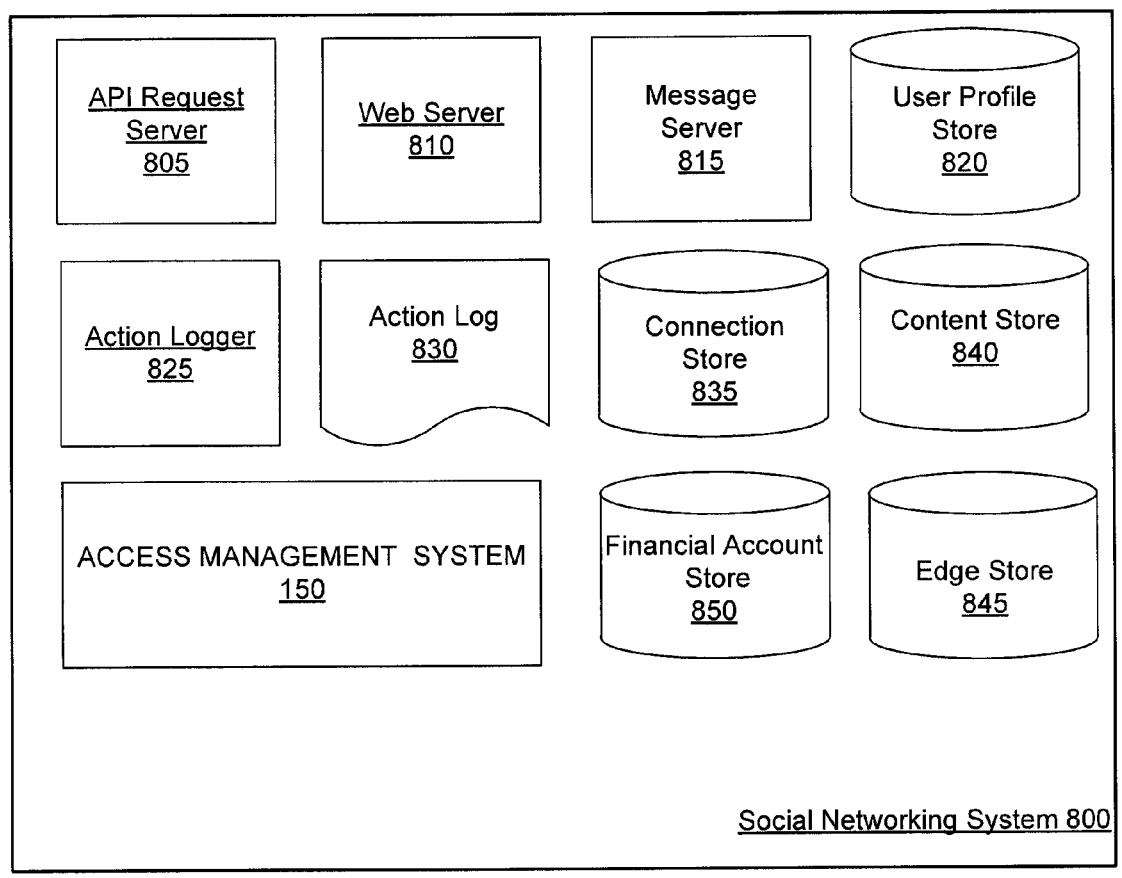
FIG. 8 is a block diagram of an example system architecture of the social networking system with which some embodiments of the present invention may be utilized.

FIG. 8 is a block diagram of a system architecture of the social networking system 800 with which some embodiments of the present invention may be utilized. Social networking system 800 illustrated by FIG. 8 includes API request server 805, web server 810, message server 815, user profile store 820, action logger 825, action log 830, connection store 835, content store 840, edge store 845, and financial account store

850. Information in the user profile store 820, content store 840, connection store 835, edge store 845, financial account store 850, and/or action log 830 can be stored in a data cluster 185, 186, and the clusters can be replicated in different regions. In other embodiments, social networking system 800 may include additional, fewer, or different modules for various applications. Conventional components such as network interfaces, security mechanisms, load balancers, failover servers, management and network operations consoles, and the like are not shown so as to not obscure the details of the system architecture.

API request server 805 allows other systems, user devices, or tools to access information from social networking system 800 by calling APIs. The information provided by the social network may include user profile information or the connection information of users as determined by their individual privacy settings. For example, a system, user device, or tools interested in accessing data connections within a social networking system may send an API request to social networking system 800 via a network. The API request is received at social networking system 800 by API request server 805. API request server 805 processes the request by submitting the access request to access management system 150 where access is determined and any data communicated back to the requesting system, user device, or tools via a network.

Web server 810 links social networking system 800 via a network to one or more client devices; the web server serves web pages, as well as other web-related content, such as Java, Flash, XML, and so forth. The web server 810 may communicate with the message server 815 that provides the functionality of receiving and routing messages between social networking system 800 and client devices. The messages processed by message server 815 can be instant messages, queued messages (e.g., email), text and SMS (short message service) messages, or any other suitable messaging technique. In some embodiments, a message sent by a user to another can be viewed by other users of social networking system 800, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 800 is associated with a user profile, which is stored in user profile store 820. A user profile includes declarative information about the user that was explicitly shared by the user, and may also include profile information inferred by social networking system 800. In one embodiment, a user profile includes multiple data fields, each data field describing one or more attributes of the corresponding user of social networking system 800. The user profile information stored in user profile store 820 describes the users of social networking system 800, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking system 800 displayed in an image. A user profile in user profile store 820 may also maintain references to actions by the corresponding user performed on content items in content store 840 and stored in the edge store 845.

A user profile may be associated with one or more financial accounts, allowing the user profile to include data retrieved from or derived from a financial account. A user may specify one or more privacy settings, which are stored in the user profile, that limit information from a financial account that social networking system 800 is permitted to access. For example, a privacy setting limits social networking system 800 to accessing the transaction history of the financial account and not the current account balance. As another example, a privacy setting limits social networking system 800 to a subset of the transaction history of the financial account, allowing social networking system 800 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by social networking system 800. In one embodiment, information from the financial account is stored in user profile store 820. In other embodiments, it may be stored in financial account store 850.

Action logger 825 receives communications about user actions on and/or off social networking system 800, populating action log 830 with information about user actions. Such actions may include, for example, adding a connection to another user, sending a message to another user, uploading an image, reading a message from another user, viewing content associated with another user, attending an event posted by another user, among others. In some embodiments, action logger 825 receives, subject to one or more privacy settings, transaction information from a financial account associated with a user and identifies user actions from the transaction information. For example, action logger 825 retrieves vendor identifiers from the financial account's transaction history and identifies an object, such as a page, in social networking system 800 associated with the vendor identifier. This allows action logger 825 to identify a user's purchases of products or services that are associated with a page, or another object, in content store 840. In addition, a number of actions described in connection with other objects are directed at particular users, so these actions are associated with those users as well. These actions are stored in action log 830.

Action log 830 may be used by social networking system 800 to track user actions on social networking system 800, as well as external website that communicate information to social networking system 800. Users may interact with various objects on social networking system 800, including commenting on posts, sharing links, and checking-in to physical locations via a mobile device, accessing content items in a sequence or other interactions. Information describing these actions is stored in action log 830. Additional examples of interactions with objects on social networking system 800 included in action log 830 include commenting on a photo album, communications between users, becoming a fan of a musician, adding an event to a calendar, joining a groups, becoming a fan of a brand page, creating an event, authorizing an application, using an application and engaging in a transaction. Additionally, action log 830 records a user's interactions with advertisements on social networking system 800 as well as other applications operating on social networking system 800. In some embodiments, data from action log 830 is used to infer interests or preferences of the user, augmenting the interests included in the user profile and allowing a more complete understanding of user preferences.

Action log 830 may also store user actions taken on external websites and/or determined from a financial account associated with the user. For example, an e-commerce website that primarily sells sporting equipment at bargain prices may recognize a user of social networking system 800 through social plug-ins that enable the e-commerce website to identify the user of social networking system 800. Because users of social networking system 800 are uniquely identifiable, e-commerce websites, such as this sporting equipment retailer, may use the information about these users as they visit their websites. Action log 830 records data about these users, including webpage viewing histories, advertisements that were engaged, purchases made, and other patterns from shopping and buying. Actions identified by action logger 825 from the transaction history of a financial account associated with the user allow action log 830 to record further information about additional types of user actions.

Content store 840 stores content items associated with a user profile, such as images, videos or audio files. Content items from content store 840 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 800. Examples of social networking content items include suggested connections or suggestions to perform other actions, media provided to, or maintained by, social networking system 800 (e.g., pictures or videos), status messages or links posted by users to the social networking system, events, groups, pages (e.g., representing an organization or commercial entity), and any other content provided by, or accessible via, the social networking system.

Content store 840 also includes one or more pages associated with entities having user profiles in user profile store 820. An entity is a non-individual user of social networking system 800, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 840, allowing social networking system users to more easily interact with the vendor via social networking system 800. A vendor identifier is associated with a vendor's page, allowing social networking system 800 to identify the vendor and/or to retrieve additional information about the vendor from user profile store 820, action log 830 or from any other suitable source using the vendor identifier. In some embodiments, the content store 840 may also store one or more targeting criteria associated with stored objects and identifying one or more characteristics of a user to which the object is eligible to be presented.

In one embodiment, edge store 845 stores the information describing connections between users and other objects on social networking system 800 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 800, such as expressing interest in a page on the social networking system, sharing a link with other users of the social networking system, and commenting on posts made by other users of the social networking system. Edge store 845 stores edge objects that include information about the edge, such as affinity scores for objects, interests, and other users. Affinity scores may be computed by social networking system 800 over time to approximate a user's affinity for an object, interest, and other users in social networking system 800 based on the actions performed by the user. Multiple interactions between a user and a specific object may be stored in one edge object in edge store 845, in one embodiment. In some embodiments, connections between users may be stored in user profile store 820, or user profile store 820 may access edge store 845 to determine connections between users.

Figure 9:
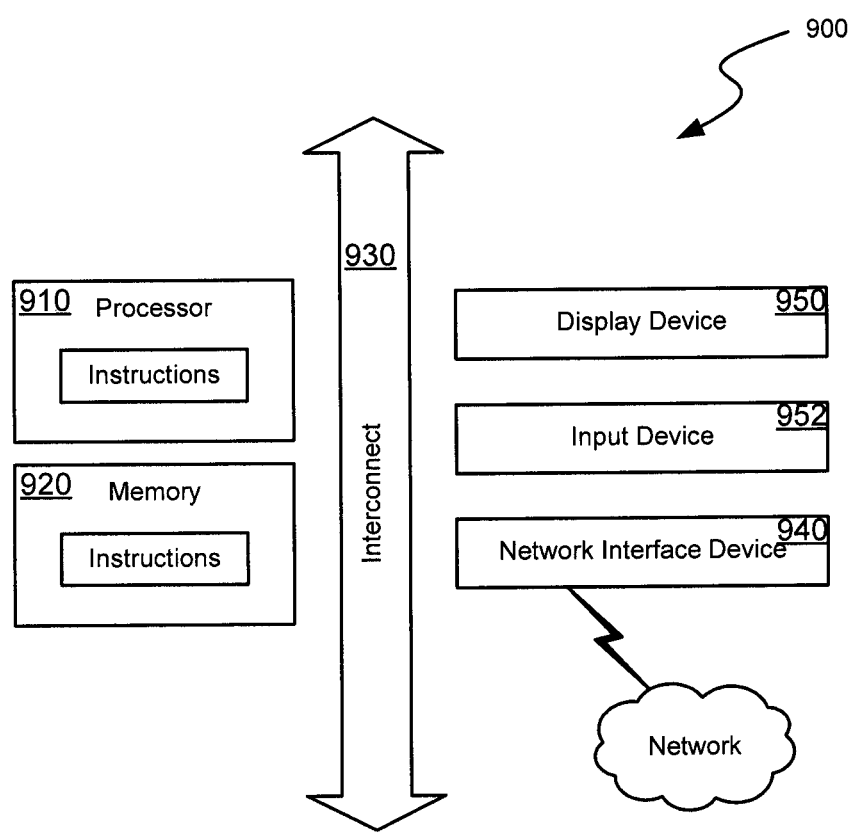
FIG. 9 is a block diagram showing an example of the architecture for a system that can be used to maintain cache consistency among different regions according to an embodiment of the present disclosure.

FIG. 9 is a block diagram showing an example of the architecture for a system 900 that can be utilized to implement the techniques described herein. The system 900 can reside in the cache, database, regional pool, wormhole module, subscriber, or web server. In FIG. 9, the system 900 includes one or more processors 910 and memory 920 connected via an interconnect 930. The interconnect 930 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 910 can include central processing units (CPUs) that can execute software or firmware stored in memory 920. The processor(s) 910 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 920 represents any form of memory, such as random access memory (RAM), read-only memory (ROM), flash memory, or a combination of such devices. In use, the memory 920 can contain, among other things, a set of machine instructions which, when executed by processor 910, causes the processor 910 to perform operations to implement embodiments of the present invention.

Also connected to the processor(s) 910 through the interconnect 930 is a network interface device 940. The network interface device 940 provides the system 900 with the ability to communicate with remote devices, and may be, for example, an Ethernet adapter or Fiber Channel adapter.

The system 900 can also include one or more optional input devices 952 and/or optional display devices 950. Input devices 952 can include a keyboard, a mouse or other pointing device. The display device 950 can include a cathode ray tube (CRT), liquid crystal display (LCD), or some other applicable known or convenient display device.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. An apparatus located in a first region of a system, the apparatus comprising:
    a memory configured to store database updates performed on a first database cluster in the first region, wherein each database update corresponds to a key, and a first invalidation associated with the key is appended to the update; and
    a processor configured to:
        in a event that a replica database in a second region remote from the first region has failed and cannot respond to database updates, publish a first subset of the first invalidations to a subscriber in the second region, wherein the first subset of the first invalidations are associated with keys having values stored in the replica database,
    wherein the subscriber is configured to send the first subset of the first invalidations to caches in the second region to cause values stored in the caches for the keys to be deleted;
    wherein, in an event that at least one cache of the caches does not have a value for a requested key stored in the at least one cache, the at least one cache is configured to generate to a token associated with the requested key and to send the token to a web server requesting the value, wherein the value for the requested key is set in the at least one cache upon receiving, at the at least one cache, the token from the web server;
    wherein after the web server retrieves the value for the requested key from the read-only data cluster and sends the value and the token to the at least one cache for setting the value in the cache, the cache is configured to discard the value if the token has been extinguished, wherein the token is extinguished when a new value for the requested key has been set in the cache by another web server after the token has been generated and before the token is sent back to the cache by the web server.

2. The apparatus of claim 1, wherein the processor extracts the first subset of the first invalidations from the database updates for publication upon receiving a signal that the replica database has failed.

3. The apparatus of claim 1, wherein databases in the system run a MySQL relational database management system, and MySQL replication statements are used to send the database updates to appropriate replica databases in the system.

4. The apparatus of claim 3, wherein a modified grammar for the MySQL replication statements is used to append the first invalidation to the database updates.

5. The apparatus of claim 1, wherein each database update further includes an optional second invalidation for a marker associated with the key, and wherein a given marker is generated and set in a regional pool in the second region by a web server in the second region upon receiving a write request for a given key to indicate that a given value stored in the caches and the replica database in the second region for the given key associated with the given marker may be stale.

6. The apparatus of claim 5, wherein the replica database, when operational, sends the first subset of the first invalidations to the caches in the second region to cause values stored in the caches for the keys to be deleted and sends the second invalidations to the regional pool to cause the marker to be deleted.

7. A system comprising:
    a processor;
    a master data cluster in a first region of the system; the master data cluster coupled to the processor;

a read-only data cluster in a second region remote from the first region, the read-only data cluster coupled to the processor, wherein the read-only data cluster is a replica of the master data cluster and comprises one or more slave databases and, further wherein the one or more slave database resides in the read-only data cluster includes a database that has failed;

an apparatus in the master data cluster configured to log database updates performed on the master data cluster, wherein each database update for a key has an invalidation associated with the key appended to the update, and further wherein the apparatus is configured to select invalidations from a portion of the log sent to the failed database for sending to a subscriber in the second region; and at least one cache in the second region;

wherein the subscriber in the second region is configured to send invalidations received from the apparatus to the at least one cache to cause the stored values for the keys specified in the invalidations to be deleted from the at least one cache;

wherein, in an event that the at least one cache does not have a value for a requested key stored in the at least one cache the at least one cache is configured to generate a token associated with the requested key and to send the token to a web server requesting the value, wherein the value for the requested key is set in the at least one cache upon receiving, at the at least one cache, the token from the web server;

wherein after the web server retrieves the value for the requested key from the read-only data cluster and sends the value and the token to the at least one cache for setting the value in the cache, the cache is configured to discard the value if the token has been extinguished, wherein the token is extinguished when a new value for the requested key has been set in the cache by another web server after the token has been generated and before the token is sent back to the cache by the webs server.

8. The system of claim 7, further comprising:

a regional pool in the second region configured for storing markers for keys, wherein each database update further includes an optional marker invalidation for a marker associated with a key for the database update;

one or more web servers in the second region, wherein the one or more web servers are configured to respond to write requests, and to generate a corresponding marker for each write request for storing in the regional pool that indicates to the one or more web servers that values for the associated keys stored in the at least one cache and the read-only data cluster may be stale.

9. The system of claim 8, wherein the one or more slave databases, when operational, sends the optional marker invalidation to the regional pool to cause the marker to be deleted.

10. The system of claim 7, wherein the one or more slave databases receive respective database updates with appended invalidations from the master database cluster, and further wherein the one or more slave databases, when operational, send the appended invalidations to the at least one cache in the second region to cause the stored values for the keys specified in the appended invalidations to be deleted from the at least one cache.

11. The system of claim 10, wherein databases in the master data cluster and the read-only data cluster run a MySQL relational database management system, and MySQL replication statements are used to send the database updates from the master data cluster to the replica databases in the system.

12. A computer-implemented method comprising:

publishing from a module in a first region of a system selected invalidations to a subscriber in a second region of the system, wherein the selected invalidations are associated with keys having selected values stored that are stored in a slave database in the second region, and further wherein the slave database has failed and cannot process the selected invalidations;

sending by the subscriber in the second region of the system, the selected invalidations to caches in the second region to cause to be deleted values stored in the caches for the keys;

receiving, at one of the caches, a request from a web server for a value for a specified key;

upon determining that the value is not stored in the one of the caches, generating, by a token generation module of the one of the caches, a token associated with the specified key;

sending the token to the web server; and setting the value for the specified key upon receiving the token and the value from the web server if the token has not been extinguished;

otherwise, discarding the value for the specified key;

wherein the token is extinguished when a new value for the specified key has been set in the one of the caches by another web server after the token has been generated and before the token is received by the web server.

13. The computer-implemented method of claim 12, further comprising logging database updates sent from a master data cluster in the first region to a replica data cluster in the second region, wherein each database update corresponds to a specified key, and an invalidation associated with the key is appended to the database update, and further wherein the failed slave database is part of the replica data cluster.

14. The computer-implemented method of claim 13, further comprising upon receiving a signal that the slave database has failed, extracting the selected invalidations from the logged database updates.

15. The computer-implemented method of claim 13, wherein each database update further includes an optional marker invalidation for a marker associated with the key, wherein the marker is generated by a web server in the second region upon receiving a write request from a client, and the web server sets the marker in a regional pool in the second region to indicate to one or more web servers in the second region that values for the associated keys in the caches and the slave database in the second region may be stale.

16. The computer-implemented method of claim 15, wherein the slave database, when operational, sends the optional marker invalidation to the regional pool to cause the marker to be deleted.

17. The computer-implemented method of claim 12, wherein in the databases in the master data cluster and the replica data cluster run a MySQL relational database management system, and MySQL replication statements are used to send the database updates from the master data cluster to the replica databases in the system.

* * * * *